US010299118B1

(12) United States Patent
Karachiwala et al.

(10) Patent No.: US 10,299,118 B1
(45) Date of Patent: May 21, 2019

(54) AUTHENTICATING A PERSON FOR A THIRD PARTY WITHOUT REQUIRING INPUT OF A PASSWORD BY THE PERSON

(71) Applicant: Benten Solutions Inc., Belmont, CA (US)

(72) Inventors: Huzefa Karachiwala, Belmont, CA (US); Terence Sheehy, West Palm Beach, FL (US); Tsang Ming Jiang, Fremont, CA (US)

(73) Assignee: Benten Solutions Inc., Belmont, CA (US)

( * ) Notice: Subject to any disclaimer, the term of this patent is extended or adjusted under 35 U.S.C. 154(b) by 356 days.

(21) Appl. No.: 15/169,168

(22) Filed: May 31, 2016

Related U.S. Application Data

(60) Provisional application No. 62/169,121, filed on Jun. 1, 2015.

(51) Int. Cl.
*H04W 12/06* (2009.01)
*H04L 29/06* (2006.01)

(52) U.S. Cl.
CPC .......... *H04W 12/06* (2013.01); *H04L 63/067* (2013.01); *H04L 63/0838* (2013.01); *H04L 63/10* (2013.01)

(58) Field of Classification Search
CPC .. H04W 12/06; H04L 63/067; H04L 63/0838; H04L 63/10
USPC .......................................................... 726/4
See application file for complete search history.

(56) References Cited

U.S. PATENT DOCUMENTS

| | | | | |
|---|---|---|---|---|
| 8,041,954 B2* | 10/2011 | Plesman | ............... | H04L 9/3228 713/182 |
| 8,087,074 B2* | 12/2011 | Popp | .................... | H04L 9/3228 726/9 |
| 8,412,928 B1* | 4/2013 | Bowness | ............ | H04L 63/0838 713/155 |
| 8,572,684 B1* | 10/2013 | Sama | .................. | H04L 63/0838 726/2 |

(Continued)

OTHER PUBLICATIONS

Purcher, Jack, Apple Patent Reveals Secure iWallet System with iBeacon, Jan. 16, 2014, Patently Apple, 10 pages, available at <http://www.patentlyapple.com/patently-apple/2014/01/apple-patent-reveals-secure-iwallet-system-with-ibeacon.html>, accessed Sep. 10, 2014.

(Continued)

*Primary Examiner* — Taghi T Arani
*Assistant Examiner* — Badri Narayanan Champakesan
(74) *Attorney, Agent, or Firm* — Staniford Tomita LLP

(57) ABSTRACT

A request including a user identifier is received from a third party to authenticate an access attempt by a person. The input of the user identifier is not accompanied by a password. A listing of associated mobile devices is transmitted to the third party. The person selects a mobile device to which an authentication notification should be sent. The notification is pushed to the mobile device. A user of the device views the notification and verifies whether the access should be allowed or denied. If access should be allowed, a first one-time password (OTP) is generated and transmitted to an authentication server. The server generates a second OTP. If the second OTP matches the first OTP, the server notifies the third party that access should be permitted. If the second OTP does not match the first OTP, the server notifies the third party that access should be blocked.

19 Claims, 15 Drawing Sheets

(56) References Cited

U.S. PATENT DOCUMENTS

| | | | | |
|---|---|---|---|---|
| 8,646,060 B1* | 2/2014 | Ben Ayed | ........... | H04L 63/0853 726/9 |
| 8,935,777 B2* | 1/2015 | DeSoto | ................ | H04W 12/06 726/18 |
| 8,943,320 B2* | 1/2015 | Sabin | ...................... | H04W 4/00 713/171 |
| 8,990,888 B2* | 3/2015 | Busser | ................... | G06F 21/31 380/44 |
| 9,283,931 B2* | 3/2016 | Skelton | .................. | B60R 25/00 |
| 9,537,661 B2* | 1/2017 | Khalil | ................ | H04L 63/0853 |
| 9,621,546 B2* | 4/2017 | Lee | ..................... | H04L 63/0838 |
| 9,641,521 B2* | 5/2017 | Egan | ................... | H04L 63/0853 |
| 9,647,840 B2* | 5/2017 | Dietrich | .................. | G06F 21/35 |
| 9,807,610 B2* | 10/2017 | Rasheed | ................ | H04L 9/3215 |
| 9,979,719 B2* | 5/2018 | Oberheide | .......... | H04L 63/0838 |
| 10,021,698 B2* | 7/2018 | Thies | ................ | H04W 72/0493 |
| 2003/0204726 A1* | 10/2003 | Kefford | ................... | G06F 21/42 713/171 |
| 2007/0174904 A1* | 7/2007 | Park | ................... | H04L 63/0838 726/7 |
| 2011/0078773 A1* | 3/2011 | Bhasin | ................ | H04L 63/0838 726/5 |
| 2011/0137742 A1* | 6/2011 | Parikh | ................... | G06Q 20/04 705/26.1 |
| 2011/0219427 A1* | 9/2011 | Hito | ........................ | G06F 21/00 726/3 |
| 2012/0138679 A1* | 6/2012 | Doyle | .............. | G06K 19/06037 235/380 |
| 2013/0014237 A1* | 1/2013 | Krogh | ..................... | G06F 21/31 726/6 |
| 2013/0111208 A1* | 5/2013 | Sabin | ..................... | H04W 4/00 713/171 |
| 2013/0219479 A1* | 8/2013 | DeSoto | ................ | H04W 12/06 726/6 |
| 2014/0019367 A1* | 1/2014 | Khan | .................... | G06Q 30/06 705/75 |

OTHER PUBLICATIONS

Duo Security, Guide to Two-Factor Authentication, 2 pages, available at <https://guide.duo.com>, accessed May 27, 2016.

SAASPASS, How to Setup and Use SAASPASS, 8 pages, available at <https://www.saaspass.com/how-to-set-up-saaspass-and-use-it.html>, accessed Jun. 27, 2016.

Dignan, Larry, Verizon Eyes QR Codes as Authentication Option, Aug. 26, 2014, ZDNet, 6 pages, available at <http://www.zdnet.com/article/verizon-eyes-qr-codes-as-authentication-option/> accessed May 5, 2015.

* cited by examiner

Authentication Flow

AUTHENTICATING A PERSON FOR A THIRD PARTY WITHOUT REQUIRING INPUT OF A PASSWORD BY THE PERSON

CROSS-REFERENCE TO RELATED APPLICATIONS

This application claims the benefit of U.S. provisional patent application 62/169,121, filed Jun. 1, 2015, which is incorporated by reference along with all other references cited in this application.

BACKGROUND

The present invention relates to the field of security, including, more particularly, to systems and techniques for authenticating users.

Security is an important concern in today's online world. Keeping track of online accounts and their associated passcodes or passwords has become quite tedious. Hackers are stealing passwords more frequently. Fraudsters are taking advantage of this and causing billions of dollars of losses to our economy.

There is a need for systems and techniques to facilitate user authentication.

BRIEF SUMMARY OF THE INVENTION

A request including a user identifier is received from a third party to authenticate an access attempt by a person. The input of the user identifier is not accompanied by a password. A listing of associated mobile devices is transmitted to the third party. The person selects a mobile device to which an authentication notification should be sent. The notification is pushed to the mobile device. A user of the device views the notification and verifies whether the access should be allowed or denied. If access should be allowed, a first one-time password (OTP) is generated and transmitted to an authentication server. The server generates a second OTP. If the second OTP matches the first OTP, the server notifies the third party that access should be permitted. If the second OTP does not match the first OTP, the server notifies the third party that access should be blocked.

In a specific embodiment, a computer-implemented method for authenticating a person for a third party includes receiving, at an authentication server, a request from the third party to authenticate an attempt by the person to access the third party, the request comprising a user identifier input by the person during the attempt, wherein the input of the user identifier by the person during the attempt is not accompanied by a password; retrieving, from a registration database at the authentication server, a list of one or more mobile devices registered at the authentication server and associated with the user identifier; transmitting, from the authentication server, the list to the third party for the third party to display to and receive from the person a selection of a mobile device from the list to which an authentication notification should be sent; receiving, from the third party, the selection of the mobile device by the person; transmitting, from the authentication server, the authentication notification to a push service for the push service to push the authentication notification to the selected mobile device, wherein the authentication notification is received by an authentication application ("app") executing on the selected mobile device, wherein upon receipt of the authentication notification the authentication app displays on an electronic screen of the selected mobile device a prompt for a user of the selected mobile device to verify whether the access to the third party should be allowed or denied, and wherein if a verification from the user is received indicating that the access should be allowed, the authentication app on the selected mobile device generates a first one-time passcode (OTP) and transmits the first OTP to the authentication server; receiving, at the authentication server from the selected mobile device, the first OTP; generating, at the authentication server, a second OTP; determining if the second OTP matches the first OTP; if the second OTP matches the first OTP, notifying the third party that the attempt to access should be permitted; and if the second OTP does not match the first OTP, notifying the third party that the attempt to access should be blocked.

The user identifier may include an email address or username. In various specific embodiments, the third party does not receive the password from the person, during the attempt to access the third party, the person provides at most to the third party the user identifier, and an indication of the mobile device to which the authentication notification should be sent, during the attempt to access the third party, the person does not input the password to the third party, the third party does not use the password to authenticate the user, or combinations of these.

The third party may include a website. The third party may include at least one of a financial services website, e-commerce website, or streaming media website. The mobile device may include a smartphone or a tablet computer.

In various specific embodiments, the authentication app does not display the first one-time passcode to the user, the person does not enter the first one-time passcode, the person's attempt to access the third party is permitted without the person, user, or both having manually entered any of the password, first OTP, or second OTP, or combinations of these.

Other objects, features, and advantages will become apparent upon consideration of the following detailed description and the accompanying drawings, in which like reference designations represent like features throughout the figures.

DETAILED DESCRIPTION

Figure 1:
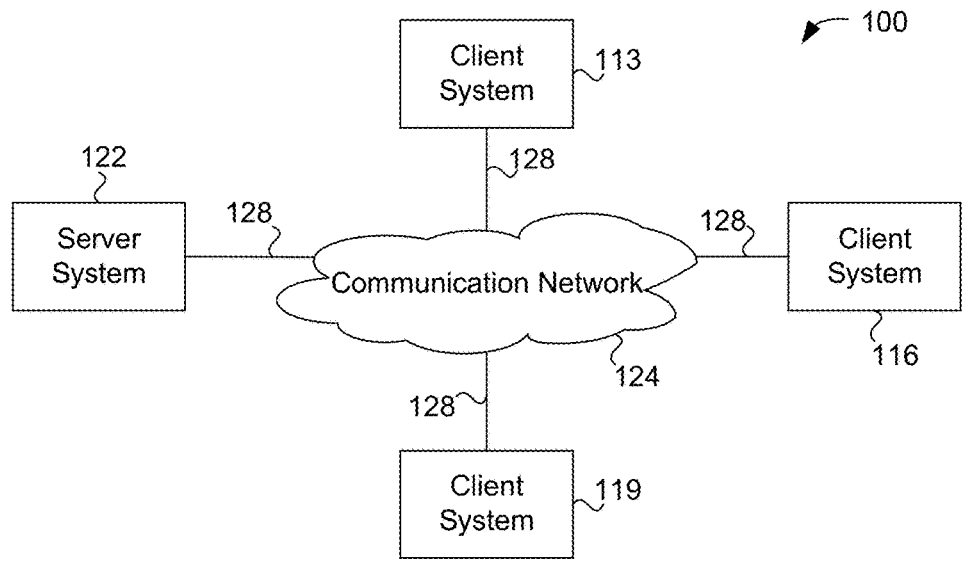
FIG. 1 shows a block diagram of a client-server system and network in which an embodiment of the system may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include Transmission Control Protocol/Internet Protocol (TCP/IP), Hyper Text Transfer Protocol (HTTP) protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the embodiment as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® and Edge® browser program provided by Microsoft® Corporation, Chrome® browser provided by Google®, Safari® browser provided by Apple, and the Firefox® browser provided by Mozilla® Foundation, and others. In another specific embodiment, an iOS App or an Android® App on a client tablet or smartphone enables users to select, access, retrieve, or query information stored by server system 122. Access to the system can be through a mobile application program or app that is separate from a browser.

Figure 2:
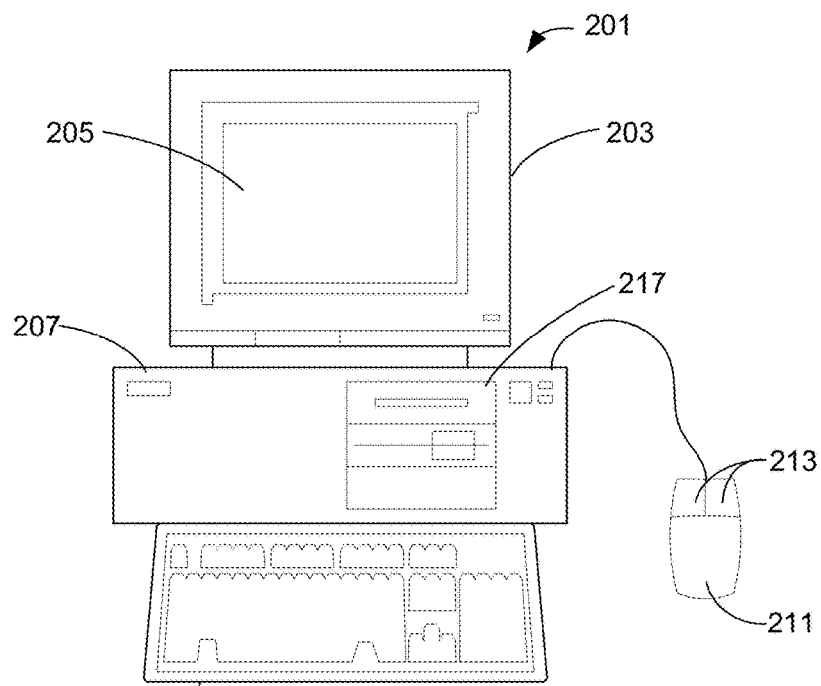
FIG. 2 shows a more detailed diagram of an example of a client or computer which may be used in an embodiment.

FIG. 2 shows an example of a client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, Compact Disc-Read Only Memory (CD-ROMs), recordable Compact Disc (CDs), Digital Versatile Disc (DVDs), recordable DVDs (e.g., DVD-R, DVD+R, DVD-RW, DVD+RW, HD-DVD, or Blu-ray Disc®), flash and other nonvolatile solid-state storage (e.g., Universal Serial Bus (USB) flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or Random Access Memory (RAM). Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

It should be appreciated that the client shown in FIG. 2 is merely an example of a particular type of client (e.g., desktop computer). A client computer can be a mobile device, tablet computer, laptop, or smartphone.

Figure 3:
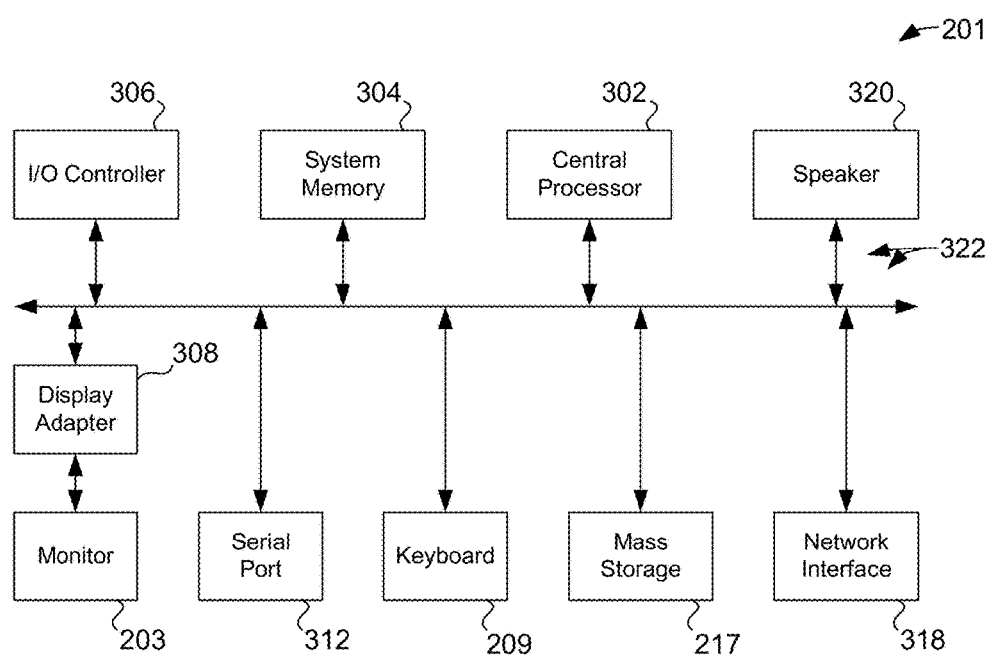
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), Statistical Analysis System (SAS), Statistical Package for Social Sciences (SPSS), JavaScript®, Asynchronous Javascript and XML (AJAX), Java®, Structured Query Language (SQL), and XQuery (a query language that is designed to process data from XML files or any data source that can be viewed as Extensible Markup Language (XML), Hypertext Markup Language (HTML), or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, a computer program product is provided that stores instructions such as computer code to program a computer to perform any of the processes or techniques described.

An operating system for the system may be iOS by Apple®, Inc., Android by Google®, one of the Microsoft Windows® family of operating systems (e.g., Windows NT®, Windows 2000®, Windows XP®, Windows XP® x64 Edition, Windows Vista®, Windows 7®, Windows CE®, Windows Mobile®, Windows 8, Windows 10), Linux, HP-UX, UNIX, Sun OS®, Solaris®, Mac OS X®, Alpha OS®, Advanced Interactive eXecutive (AIX), IRIX32 (Operating system developed by Silicon Graphics, Inc.), or IRIX64 (Operating system developed by Silicon Graphics, Inc.). Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (Institute of Electrical and Electronics Engineers (IEEE) standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, Portable Document Format (PDF), and postscript, and may be used to upload information to other parts of the system. The Web browser may use Universal Record Locator (URLs) to identify resources on the Web and hypertext transfer protocol (HTTP) in transferring files on the Web.

In a specific embodiment, a system for generating an algorithmic and non-persistent passcode or password includes a passcode generator, a mobile application program or app, and a website. In this specific embodiment, the passcode generator includes a variation of the MersenneTwister algorithm. It should be appreciated, however, that the MersenneTwister algorithm is merely an example of a pseudorandom number generator that can be used and any other appropriate algorithm may instead or additionally be used. In a specific embodiment, any algorithm capable of generating a unique 8 to 32 digit passcode may be used.

In a specific embodiment, the app is, for example, an Android or iPhone app or other mobile app that is capable of registering to a site which allows on demand authentication, and generating a passcode based on the passcode generator above.

In a specific embodiment, the website is capable of accepting on demand registration, and generating a passcode based on the passcode generator specified above to validate an in-coming authentication request.

Figure 4:
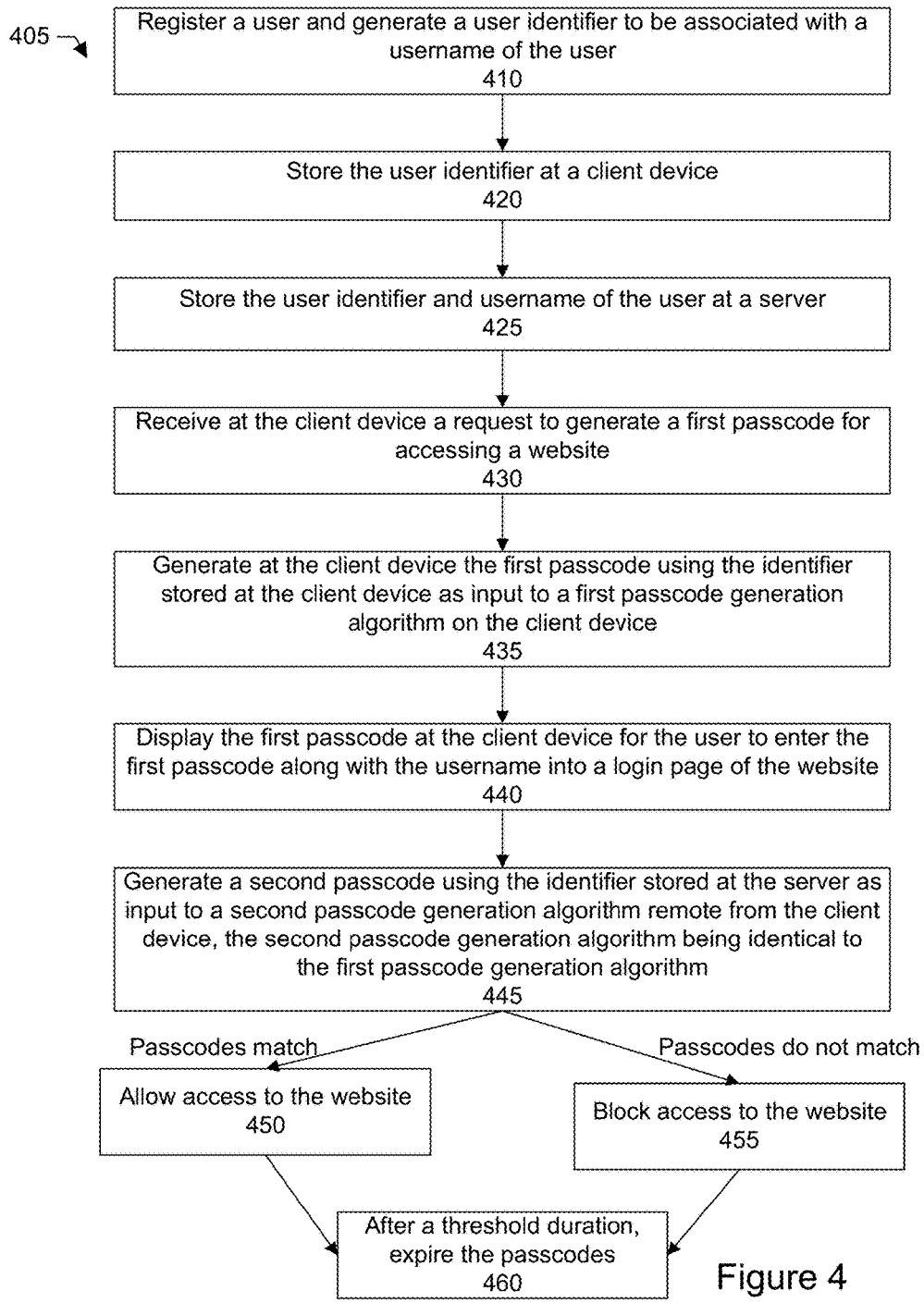
FIG. 4 shows an overall flow diagram of a system for algorithmic and non-persistent passcodes in an embodiment.

FIG. 4 shows an overall flow 405 of a specific embodiment of a system for an algorithmic and non-persistent passcode. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, a user registers with a website and a user identifier to be associated with a username of the user is generated. The website can be any website that the user would like to be able to access using the non-persistent passcode provided by the system. For example, the website can be an ecommerce site (e.g., Amazon, or eBay), an online trading site (e.g., E*Trade), an email service (e.g., Gmail, or Yahoo email), and so forth.

The registration process may include, for example, the user providing a username, e-mail, and a few user specific questions and answers. In a specific embodiment, the user also registers the client device with the website. In particular, the user uses his or her device to register the client device with the website using an authentication app on the client device (e.g., mobile device).

Below is an example of a flow for registration:
1) Launch App
2) Select Registration tab
3) Specify username and begin registration
4) Website will request app to answer the user specific question before proceeding with registration
5) App will generate proprietary unique user identifiers which will be used in the proprietary algorithm to generate passcodes for the user
6) Provide the website with the proprietary unique user identifiers to be associated with the user 7) If the website already has another set of identifiers associated with this user (such case will happen when a user is trying to associate a new device with an existing username), the website will send an e-mail to the user to have the user verify that this is a registration request.

The user identifiers may be generated using any technique that can generate a unique or practically unique identifier. A user identifier may be generated using, for example, a timestamp, media access control address (MAC address) of the computer generating the user identifier, hash function, the client device's unique device identifier, mathematical operations and functions, or combinations of these.

In a step 420, the user identifier is stored at the client device (e.g., mobile device). The user identifier may be stored on the client device in an encrypted format so that only authorized parties (or programs) can read the identifier. In a step 425, the user identifier and associated username of the user is stored at a server. Likewise, the user identifier stored on the server may also be stored in an encrypted format.

Below is an example of a flow for authentication according to a specific embodiment:

1) User logs into the authentication App on his or her device
2) Select Passcode tab and hit Generate button
2a) Smartphone app will use its unique proprietary identifiers and the current time slot to generate a unique passcode
3) Use the passcode displayed for logging into the Website
3a) The website will look up the unique proprietary identifiers for the user currently trying to log in. Using the identifier and the current time slot, it will generate a unique passcode. If the passcode generated is the same as the passcode provided then the authentication is success or login failure message is displayed. In a specific embodiment, selecting the Passcode tab and hitting the Generate button (step 2) is optional and is not included some embodiments.

For example, in a step 430, the app on the client device (e.g., mobile device) receives from the user a request to generate a first passcode for accessing the website.

In a step 435, the app generates at the client device the first passcode. The first passcode is generated using the user identifier stored at the client device as input to a first passcode generation algorithm on the client device. In a specific embodiment, the algorithm is the MersenneTwister algorithm or a variation of the MersenneTwister algorithm.

In a step 440, the app displays the first passcode on an electronic screen of the client device. The user can view the first passcode and enter the first passcode along with their username into a login page of the website the user wishes to access. Thus, the user does not have to remember a passcode for accessing the website. The app can automatically retrieve the user identifier stored at the client device and provide, as input, the user identifier to the passcode generation algorithm on the client device. In turn, the passcode generation algorithm outputs the first passcode. The first passcode and username as entered by the user at the client device is then transmitted to the website or server.

In a step 445, the server uses the user's username to retrieve the user identifier stored at the server. This user identifier is then provided as input to a second passcode generation algorithm, remote from the client device, to generate a second passcode. The second and first passcode generation algorithms are identical. Thus, both algorithms will produce identical output when provided identical input.

A determination is then made as to whether the first and second passcodes match. For example, the first passcode may be compared with the second passcode. If the passcodes match, in a step 450, access to the website is allowed. If the passcodes do not match, in a step 455, access to the website is blocked.

In a step 460, after a threshold duration has elapsed, the passcodes are expired. The threshold duration may range from about 15 seconds to about 60 seconds. The duration may be less than 15 seconds or greater than 60 seconds. The duration may be configurable by an administrator, the user, or both. Long durations provide more time for the user to enter the passcode. Short durations can offer more security than long durations.

For users, coming up with a passcode which is difficult for someone else to guess and remembering this passcode is becoming more and more challenging, especially in today's online world. Most commercial websites require users to provide a passcode as part of a registration process. Hence users are confronted with having to come up with multiple such passcodes.

Hackers are increasingly targeting these websites and stealing user's passcodes. In many cases, hackers are able to guess the users passcodes and gain unauthorized access to the user's personal and private information.

The systems and techniques described in this patent application, however, provide the ability to create unique time-based passcodes on the fly to solve the above problems. Users no longer have to come up with a complicated passcode that he or she needs to remember. The websites benefits by not having to save these passcodes and have these stolen by hackers. Since the passcodes are generated based on an algorithm and are not persistent, phishing becomes redundant.

Figure 5:
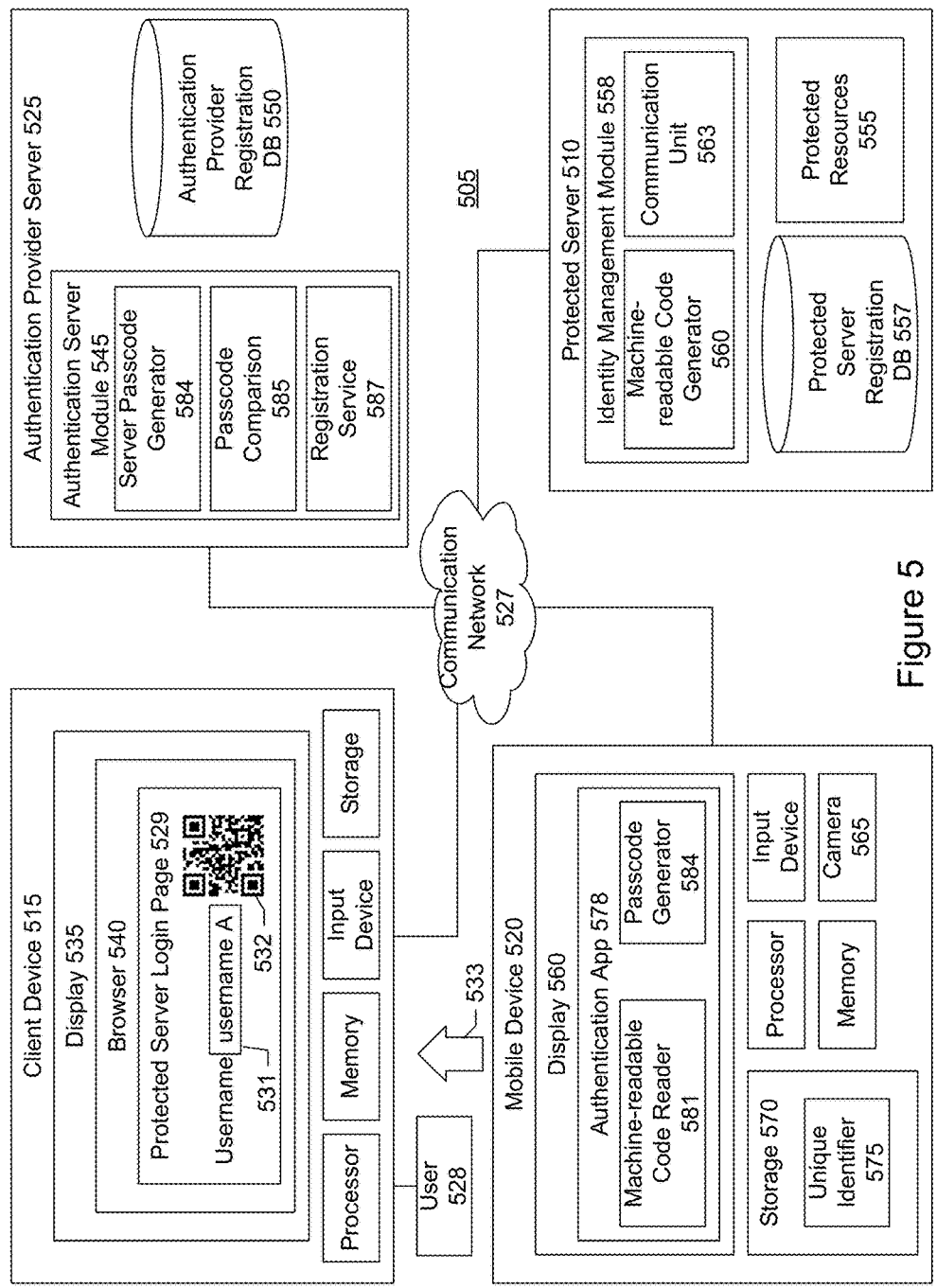
FIG. 5 shows a block diagram of a system using unique time-based passcodes for authorization without requiring a user to enter the passcodes according to a specific embodiment.

FIG. 5 shows another specific embodiment of a system 505 for authentication using a unique time-based passcode. This system allows for authentication based on a unique time-based passcode without the user having to manually input the passcode or carry a separate one-time passcode (OTP) security token (e.g., key ring fob having an OTP calculator).

This system includes a protected server system 510, a client 515, a mobile device 520, and an authentication provider server 525, each of which are interconnected by a communication network 527. In a specific embodiment, the protected server is owned, operated, managed, or controlled by a customer of the authentication provider. The customer may be referred to as a third party. The authentication provider provides authentication services for the customer to help verify the identities of persons or users attempting to access resources on the protected server. For example, the customer of the authentication provider may be an online e-commerce or shopping website (e.g., Amazon or eBay), an email service (e.g., Gmail, Yahoo Mail, or America Online (AOL) Mail), or a financial institution (e.g., Wells Fargo) and the users may be end-users of the customer.

In a specific embodiment, there can be a user 528 at the client who wishes to access protected resources at the protected server system. The protected server system provides the client with a login page 529 where the user can enter their username. Upon the user entering a valid username 531, the protected server system generates a machine-readable code that identifies the protected server and a session identifier for the login.

In a specific embodiment, the machine-readable code includes a quick response (QR) code. In various other specific embodiments, the machine-readable code includes a bar code. The machine-readable code is displayed 532 at the client. A mobile device of the user includes a unique time-based passcode generator. The user uses the mobile device to scan or read 533 the machine-readable code displayed at the client to identify the protected server. Upon scanning the machine-readable code, the unique time-based passcode and username the user used to register at the authentication provider is automatically sent from the mobile device to the protected server identified in the machine-readable code. The protected server forwards to the authentication provider. The authentication provider generates a corresponding unique time-based passcode. If the two passcodes match, the authentication provider authorizes access to the protected resources. If the two passcodes do not match, the authentication provider denies authorization to access the protected resources.

The system allows for very robust security because of the unique time-based passcodes while also providing a good user experience because the user does not have to remember a passcode, type in a lengthy one-time passcode, or keep track of a separate security token. Unique time-based passcodes are strong or difficult to crack because they can be randomly generated, can be very complex and lengthy (e.g., 124 characters), and can expire after a certain time period.

For example, the passcodes may be configured to expire after 5 seconds, 15 seconds, 30 seconds, 60 seconds, or any other time period as desired. The duration for which the unique time-based passcode will be valid can be very short (e.g., 3 seconds) because there is no need to wait for the user to type in the passcode. Rather, the duration for which the passcode will be valid can be based on the amount time required to transmit the passcode to the authentication provider server and calculate a corresponding passcode at the authentication server. Further, the system can be implemented very quickly because there can be relatively little or no change to existing infrastructure.

The communication network may be as shown in FIG. 1 and described above. The protected server system, authentication provider server, client, and mobile device are computing devices that may include hardware and software, such as shown in FIGS. 2-3 and described above. For example, client 515 includes a display 535, an application program 540 (e.g., browser application program), a processor, memory, input device, and storage.

The authentication server includes a processor, memory, applications (e.g., authentication server module 545), and storage (e.g., authentication provider registration database 550). Similarly, the protected server includes a processor, memory, applications, and storage. The protected server may include a web server that delivers web pages, content, data, services, or combinations of these to the client device. The protected server system includes protected resources 555, a protected server registration database 557, and an identity management module 558.

The protected resources include resources that require user authentication for access. The protected resources can include user accounts, email accounts, banking accounts, brokerage accounts, checking accounts, savings accounts, online shopping accounts, credit card accounts, documents (e.g., internal corporate documents), services, storage devices, servers, and so forth.

For example, the protected server system of the third party may host an e-commerce or online shopping site (e.g., Amazon or eBay), a financial services website (e.g., Wells Fargo Bank or FIA Card Services (Credit Card Lender. Owned by Bank of America)), a cloud storage system, cloud services, or an internal corporate network. The protected server system may be implemented as a multi-tenant system in which a single instance of a software application serves multiple customers. In a multi-tenant system, each customer (e.g., tenant) may have their data protected and logically isolated from another customer.

Figure 6:
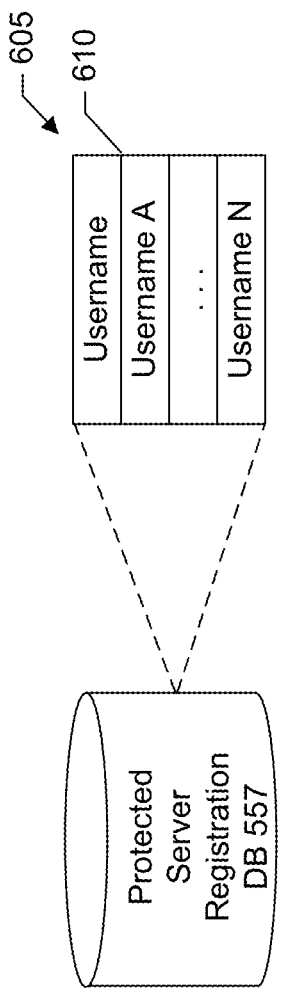
FIG. 6 shows an example of registration information stored at a protected server.

Registration database 557 stores a listing of usernames that are registered with the protected server. FIG. 6 shows an example of a table 605 that may be stored in registration database 557. This table includes a listing usernames 610 (e.g., username A . . . N) that are registered with the protected server. Registration database 557, however, does not store corresponding user passcodes or passwords.

Referring back to FIG. 5, the identity management module includes a machine-readable code generator 560 and a communication unit 563. The machine-readable code generator is responsible for generating a machine-readable code that includes an identification of the protected server (or other destination) and a session identifier (ID). In a specific embodiment, the code includes a QR code and the code generator may be referred to as a QR code generator. A QR code is a machine-readable code that includes an array of black and white squares that stores information. In a specific embodiment, the stored information includes an address such as a universal resource locator (URL) of the protected server and the session ID. A session ID is a unique number that the protected server assigns to a specific user for the duration of that user's visit (i.e., session).

In another specific embodiment, the code may be a barcode or any other machine-readable code. In another specific embodiment, the code includes text that identifies the destination where the unique time-based passcode should be sent. In this specific embodiment, the code reader includes an optical character recognition (OCR) engine to recognize the text and identify the destination where the authentication application should send the unique time-based passcode for authentication. The machine-readable code can include signs, letters, symbols, characters, images, pictures, or combinations of these, or any marking that can be read by a computer. In another specific embodiment, the client communicates the destination to the mobile device wirelessly such as via Bluetooth or near field communication (NFC) techniques.

The communication unit is responsible for coordinating or directing the communication between the protected server and the client, mobile device, and the authentication provider. The communication unit receives from the client a user login request and responds with a machine-readable code that is displayed at the client. The communication unit receives communications from the user's mobile device, forwards to the authentication provider server, and receives authorization decisions from the authentication provider.

Mobile device 520 is a small computing device that is designed to be handheld and carried by a user throughout the day. In a specific embodiment, the mobile device includes a display 560 (e.g., touchscreen display), a processor, memory, battery (e.g., lithium battery), a camera 565, and storage 570. A unique identifier 575 that may be generated when the user registers the mobile device with the authentication provider is stored in mobile device storage 570. The unique identifier may be referred to as a key.

The mobile device includes an operating system (e.g., iOS, Android, or Windows 10 Mobile) and can run various types of application software or mobile application programs that may be referred to as apps. A mobile device may further include Wi-Fi, Bluetooth, near field communication (NFC) and global positioning system (GPS) capabilities that can allow connections to the Internet and other devices, such as an automobile or a microphone headset or can be used to provide location-based services. A mobile device may include sensors such as accelerometers, compasses, magnetometers, gyroscopes, or combinations of these to allow detection of orientation and motion.

Some examples of mobile devices include smartphones (e.g., Apple iPhone, Samsung Galaxy, and Motorola Moto X), tablets (e.g., Apple iPad, Google Nexus, and Microsoft Surface), phablets (e.g., Apple iPhone 6 Plus, Samsung Galaxy Note, Huawei Ascend Mate 7, and Sony Xperia Z Ultra), and wearable computing devices (e.g., Google Glass).

The mobile device includes an authentication mobile application program or app 578. In a specific embodiment, the app may be downloaded from a mobile application marketplace such as the Apple App Store, Google Play, Amazon Appstore, or other website. In another specific embodiment, the app may be preinstalled on the mobile device such as by a vendor or manufacturer of the mobile device.

The authentication app includes a machine-readable code (e.g., QR code) reader 581 and a passcode generator 584. The machine-readable code reader is responsible for scanning, reading, or capturing the machine-readable code displayed on the client device. For example, a user may point a camera of the mobile device at the display on the client to capture the displayed machine-readable code.

The passcode generator is responsible for generating a unique time-based passcode. In a specific embodiment, the passcode generator receives or obtains unique identifier 575 stored at the mobile device as input. The passcode generator includes a passcode generation algorithm that then generates the unique time-based passcode based on the unique identifier. In other words, the unique identifier can be provided as a seed to the passcode generator. The unique identifier may be referred to as a key. The passcode may include any number of characters. In various specific embodiments, the passcode is 8, 32, 64, or 124 characters long. The passcode may be valid for any period of time. In a specific embodiment, the passcode is valid for 15 seconds. In a specific embodiment, the length of the passcode, the duration that the passcode remains valid, or both are configurable. That is, the customer of the authentication provider can decide the length of the passcode and the duration.

More particularly, in a specific embodiment, the authentication provider provides a default passcode generator. A customer who decides to use the default passcode generator can configure the length of the passcode, duration of the passcode, or both. The passcode generator, however, can be implemented in a plug and play environment that allows for one to many generators to be delivered with the authentication client application, the customer may implement or provide their own passcode generator and submit the desired passcode generator to the authentication provider to ensure that the client will have access to the generator. As part of the interaction with the login screen the machine readable code may have additional data embedded to ensure that the appropriate generator is used.

In other words, the authentication provider may provide authentication services to any number of different customers. There can be a first customer who wishes to use a first passcode generator to verify the identities of users of the first customer. There can be a second customer who wishes to use a second passcode generator, different from the first passcode generator, to verify the identities of users of the second customer. The authentication provider can store the first and second passcode generators. The users of the first customer may be provided a client authentication app that includes the first passcode generator. The users of the second customer may be provided a client authentication app that includes the second passcode generator. The machine-readable code displayed at the client device of the user may include information indicating which passcode generator the authentication provider should use to calculate the corresponding passcode.

The authentication provider is responsible for authenticating users to the protected server. Prior to authentication, users register their mobile devices with the authentication provider using a registration service 587. Registration information is stored in authentication provider registration database 550.

Figure 7:
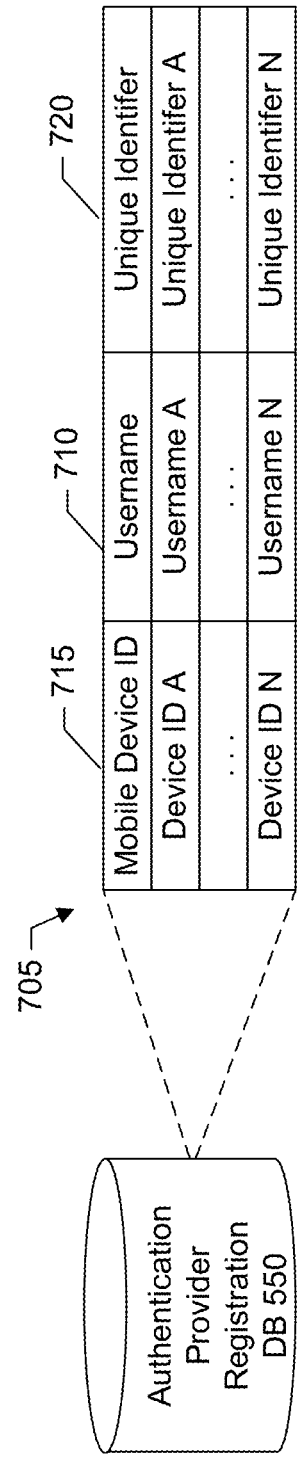
FIG. 7 shows an example of registration information stored at an authentication provider.

FIG. 7 shows an example of a table 705 that may be stored in authentication provider registration database 550. This table includes a listing usernames 710 (e.g., username A . . . N), a listing of mobile devices 715 (e.g., mobile device IDs A . . . N) associated with the usernames, and a corresponding set of unique identifiers 720 (e.g., unique identifiers A . . . N). The unique identifiers are stored on the mobile devices and at the authentication provider. For example, as shown in a first record of the table, a mobile device has been registered that has a mobile device ID A that belongs to a user having a username A. An associated unique identifier A is stored on both the mobile device and the authentication provider server.

Referring back to FIG. 5, the authentication server module includes a server passcode generator 584 and a passcode comparison unit 585. The server passcode generator is responsible for generating a unique time-based passcode that is compared to the unique time-based passcode generated by the mobile device. More specifically, during the login authentication process, the authentication provider receives from the protected server the unique time-based passcode generated by the mobile device and the username the user used to register with the authentication provider, other identifying information (e.g., session ID), or combinations of these.

The username is cross-referenced against the authentication provider registration database to obtain the unique identifier stored at the authentication provider that corresponds to or is associated with the username. The unique identifier stored at the authentication provider is provided as input to a passcode generation algorithm of the server passcode generator. The passcode generation algorithm is the same as or is synchronized to the passcode generation algorithm of the passcode generator at the mobile device. A unique time-based passcode is then generated at the authentication provider.

The passcode comparison unit is responsible for comparing the unique time-based passcode received from the mobile device via the protected server with the unique time-based passcode calculated at the authentication provider. If the passcodes match, the user is authorized to access the protected resources (or portion of protected resources) at the protected server. If the passcodes do not match, the user is not authorized to access the protected resources. For example, the authentication provider, upon making the authorization decision, may send a message to the protected server that informs the protected server of the decision. The protected server may periodically poll the authorization server for the decision.

Figure 8:
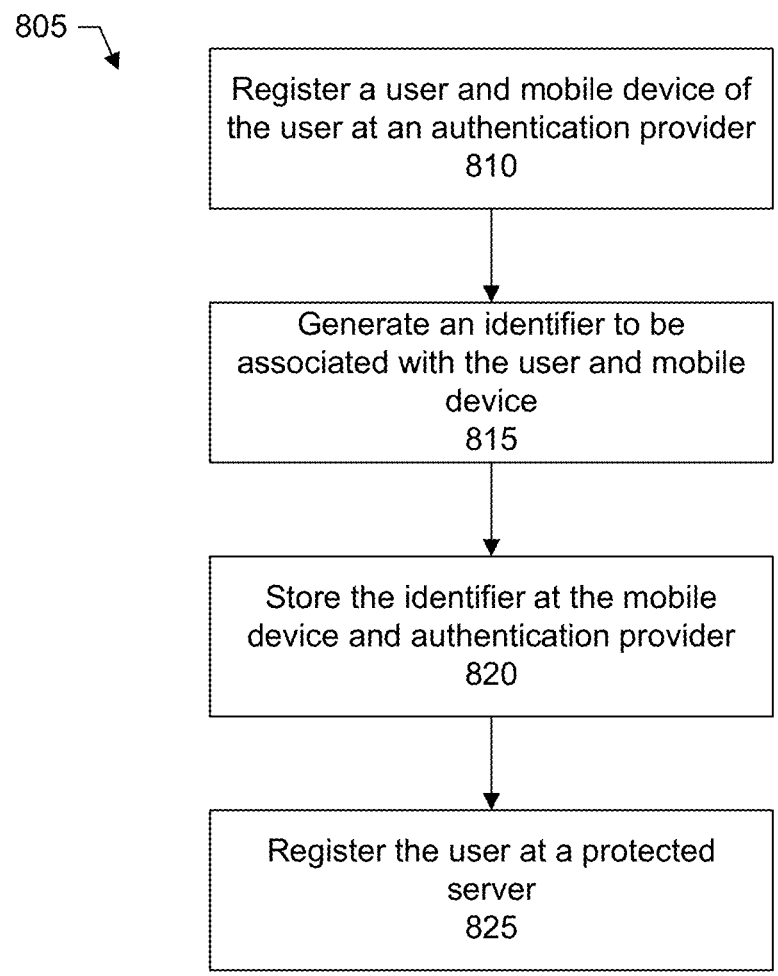
FIG. 8 shows a flow for registration according to a specific embodiment.

FIG. 8 shows an overall flow of a registration process 805 according to a specific embodiment. The registration process involves a registration at the authentication provider and a registration at the protected server. In a step 810, a user registers their mobile device at the authentication provider.

The registration includes registering a username for the user and the user's mobile device (e.g., mobile device ID).

In a step 815, a unique identifier is generated and associated with the username and mobile device. Any appropriate technique that generates a universally unique identifier (UUID) may be used.

In a step 820, the unique identifier is stored at the mobile device and the authentication provider. In a specific embodiment, the unique identifier is generated at the mobile device. A copy of the unique identifier may be sent to the authentication provider for storage. In another specific embodiment, the unique identifier is generated at the authentication provider. A copy of the unique identifier is sent to the mobile device for storage. In another specific embodiment, a unique identifier is generated at the mobile device and a same unique identifier is generated at the authentication provider.

In a step 825, the user registers with the protected server (e.g., registers with a customer of the authentication provider). This registration process may include providing the protected server with the user's username. The unique identifier can have multiple usernames associated with it; and the mobile device does not need to store user names that it will access. It is not necessary for the user to use the same username when registering with the authentication provider and the protected server (e.g., protected website). The username the user uses to register with the authentication provider and the username that the user uses to register with the protected server (e.g., protected website) may be different (or the same). For example, the user may register with the authentication provider using a first username. The user may register with the protected server using a second username, different from (or the same as) the first username.

In a specific embodiment, when registering a device with the customer of the authentication services provider; the customer will collect the username associated with the device; when registering the username/unique identifier with the authentication provider, the authentication provider can allow the device to be used for multiple services so the username may be different per customer but the unique identifier stays the same for a device owner. If there are multiple users of the device say a tablet then each device user would have their own unique identifier.

An example of multiple usernames being associated with a unique identifier would be Wells Fargo which requires a unique username to be associated with the account, but Google/Yahoo/AOL require an email address to be associated with the account. In the case of Google/Yahoo/AOL these are unique email addresses that would be associated with the unique identifier. The Wells Fargo may be one of the email addresses but it's possible that could be, for example, a social security number as the username.

Figure 9:
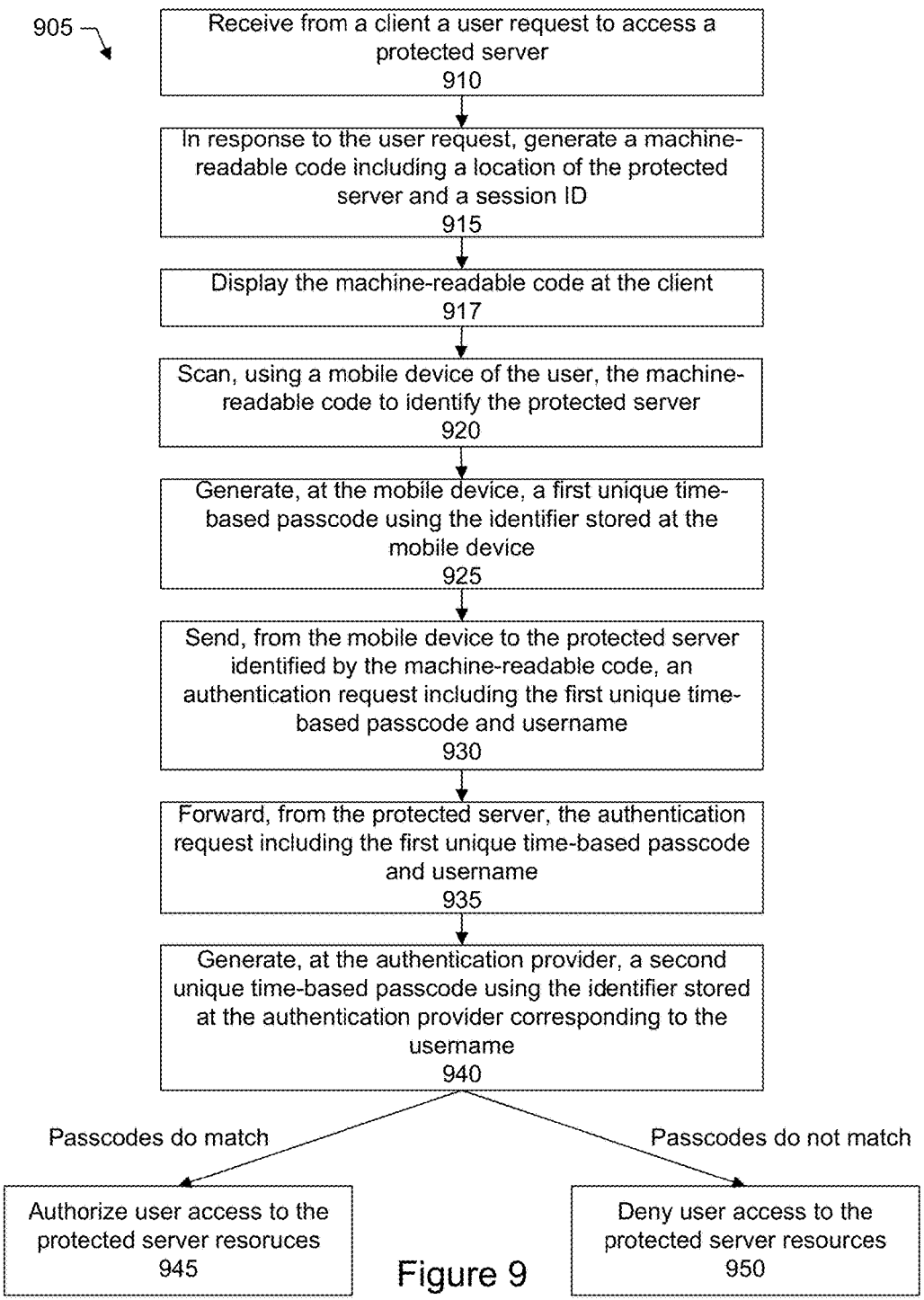
FIG. 9 shows an overall flow for using unique time-based passcodes for authorization without requiring a user to enter the passcodes.
Figure 10:
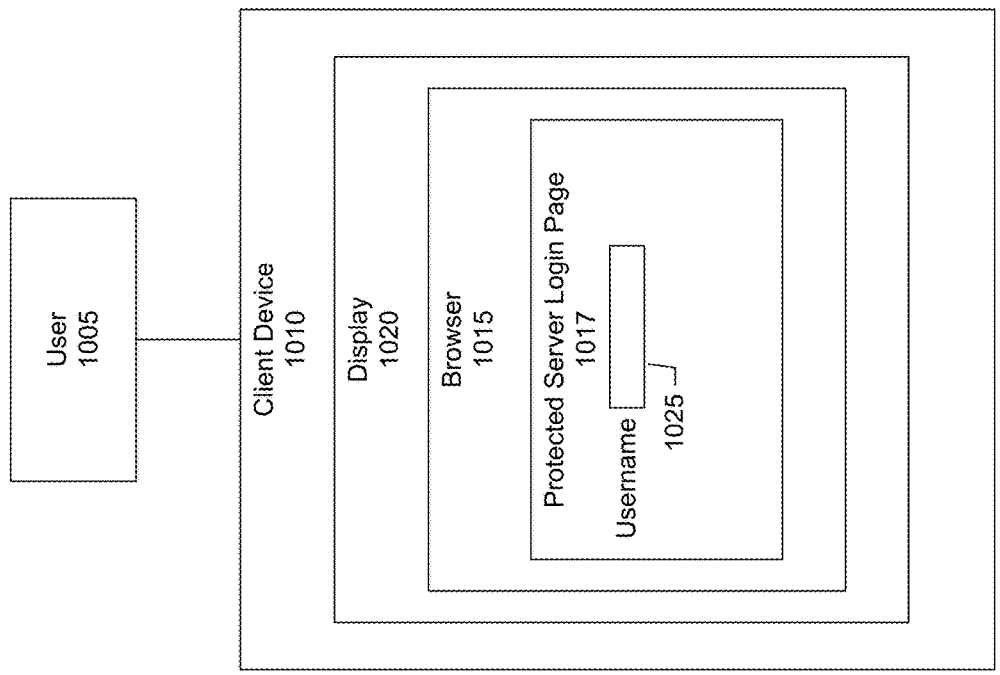
FIG. 10 shows a first state of a login page to a protected server displayed at a client.

FIG. 9 shows an overall flow 905 for authenticating a user for access to resources on a protected server. In a step 910, the protected server receives from a client a user request to access protected resources on a protected server. For example, FIG. 10 shows an example of a user 1005 at a client device 1010 in a first state. The user uses a browser 1015 at the client device to open a login page 1017 delivered by the protected server to the client when the client requests access. The login page is shown on a display 1020 of the client and may be a webpage that includes code or executable code that communicates with the protected server.

As shown in the example of FIG. 10, the login page includes an input box 1025 that the user can use to enter their username. For example, the user may use an input device of the client device such as a keyboard to input the username. In a specific embodiment, the login page does not include a passcode input box. In other words, no passcode input is shown on the login page. The user does not enter their passcode at the client device. Upon the user entering their username in the username input box (e.g., after the user has typed their username and pressed the "enter" or "tab" key), a request for access is sent from the client to the protected server. The request includes the username.

Referring back to FIG. 9, in a step 915, the protected server in response to the user request validates that the user is registered with the protected server. For example, the protected server may scan the protected server registration database with the received username to determine whether the username is registered. If the username is not registered, the user is denied access. If the username is registered, the protected server generates a machine-readable code (e.g., QR code) based on the username (or other identifying information associated with the user) that includes a location of the protected server (e.g., URL address of the protected server) and a session ID.

Figure 11:
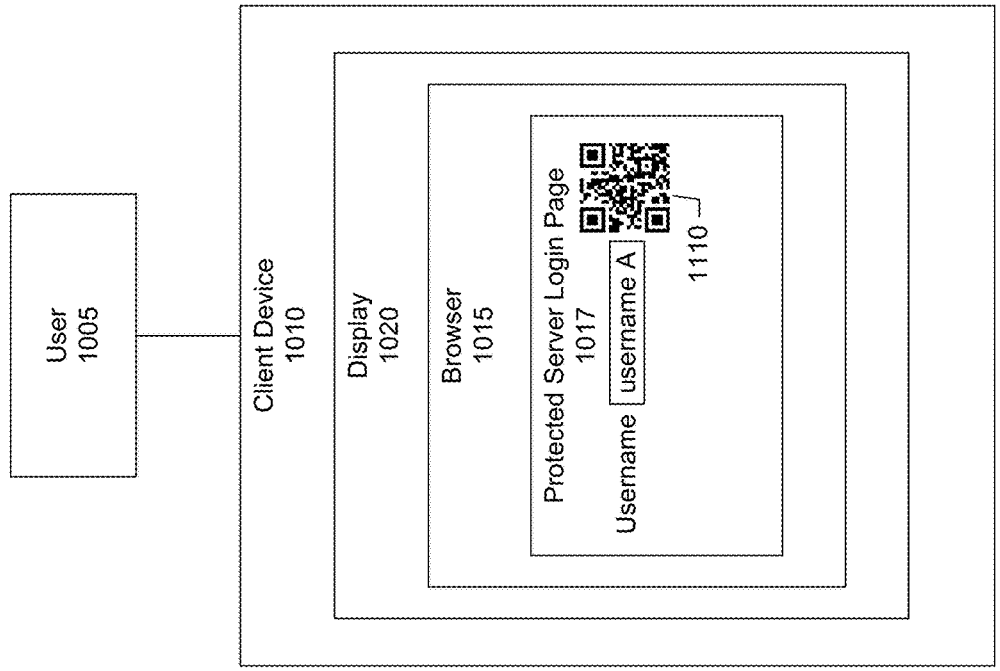
FIG. 11 shows a second state of the login page shown in FIG. 10 with a machine-readable code having been displayed after the user has entered their username.

In a step 917, the machine-readable code is sent to the client and displayed at the client. For example, FIG. 11 shows an example of the client device shown in FIG. 10 in a second state where the user has entered their username (e.g., username A) in the username input box. A machine-readable code 1110 is displayed on the protected server login page.

Figure 12:
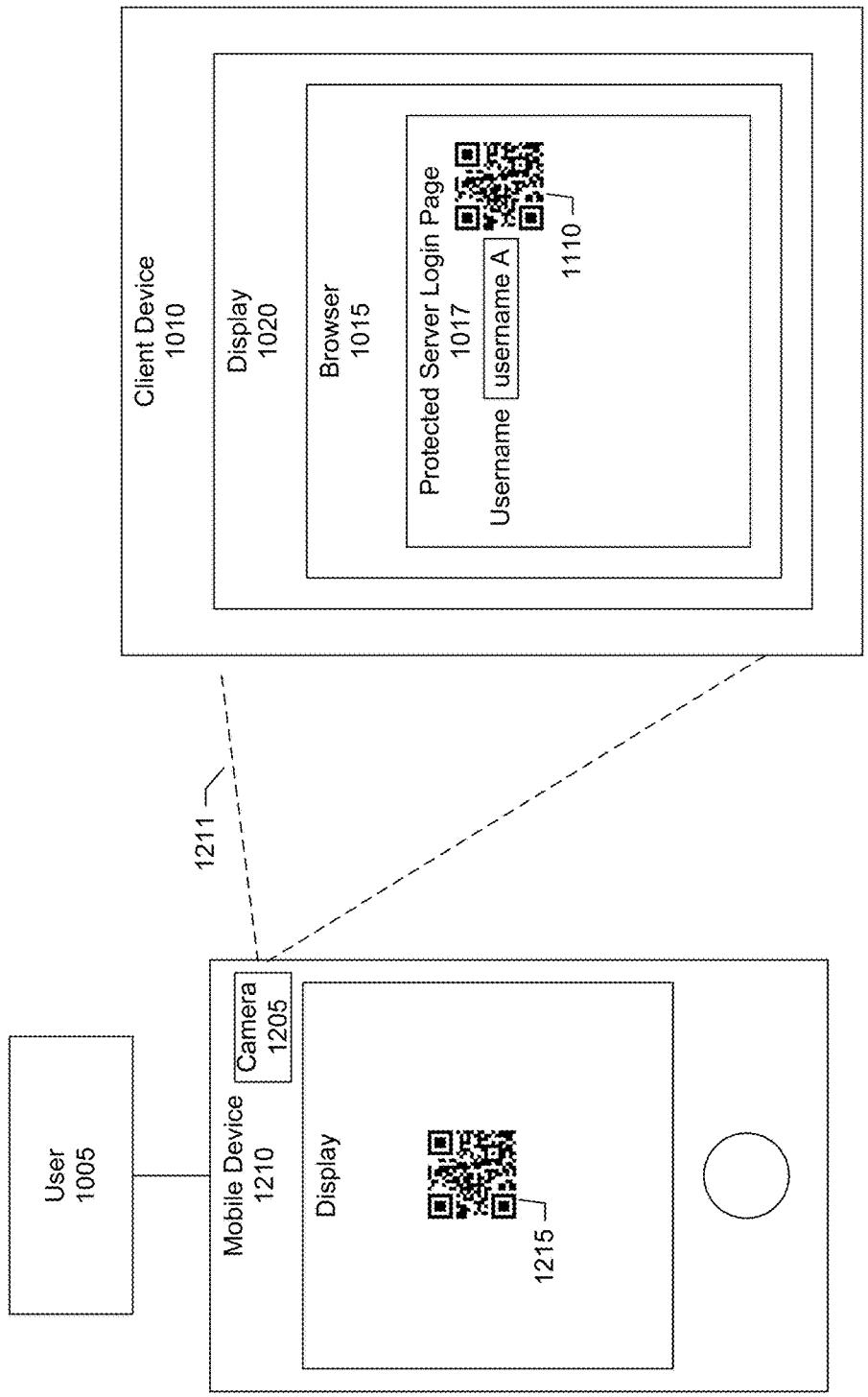
FIG. 12 shows a block diagram of a user using their mobile device to scan the machine-readable code displayed at the client.

In a step 920 (FIG. 9), the user uses the mobile device that has been registered with the authentication provider to scan the machine-readable code displayed at the client to identify the protected server. For example, FIG. 12 shows an example where user 1005 has aimed a camera 1205 of their mobile device 1210 at display 1020 of the client to capture or acquire 1211 an image 1215 of machine-readable code 1110.

In a step 925 (FIG. 9), upon acquisition of the machine-readable code image, a first unique time-based passcode is generated at the mobile device using the identifier (e.g., key) stored at the mobile device. In a step 930, an authentication request including the first unique time-based passcode and username the user used to register at the authentication provider is sent from the mobile device to the protected server (or other destination) identified by the machine-readable code. The authentication request may further include the session ID. In a specific embodiment, the first unique time-based passcode is not shown on a display of the mobile device because there is no need for the user to manually enter the passcode. The scanning of the machine-readable code automatically triggers the generation of the passcode. Upon completion of the scanning, the passcode is automatically sent (i.e., without user intervention) to the destination specified in the machine-readable code.

In a step 935, the protected server forwards the authentication request (including the first unique time-based passcode and username or other identifying information) to the authentication provider. In a step 940, the authentication provider uses the username to cross-reference the authentication provider registration database to find the corresponding unique identifier stored at the authentication server. The server-stored unique identifier is provided as input to a passcode generation algorithm at the authentication server to generate a second unique time-based passcode.

Figure 13:
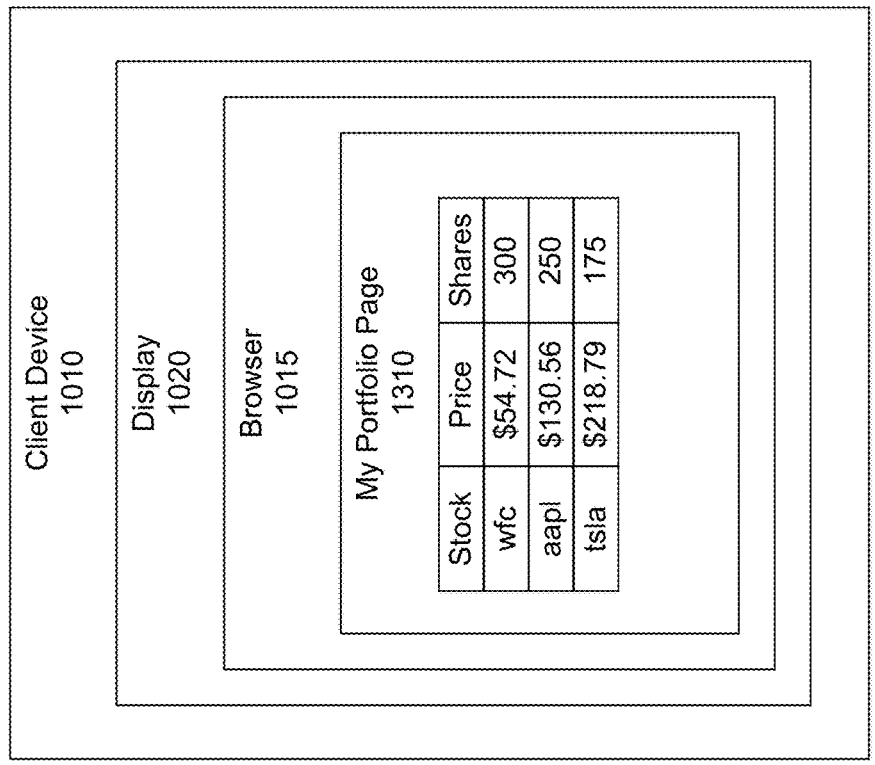
FIG. 13 shows an example of the client where the login has been authorized.

The authentication provider server compares the first and second unique time-based passcodes. If the passcodes match, in step 945, the authorization provider authorizes user access to the protected server resources (or a portion of the protected server resources). FIG. 13 shows an example of a client where the authorization provider has indicated to the protected server that access is authorized. In response, the protected server has delivered a page 1310 to the client that includes protected content (e.g., the user's portfolio of stocks).

Figure 14:
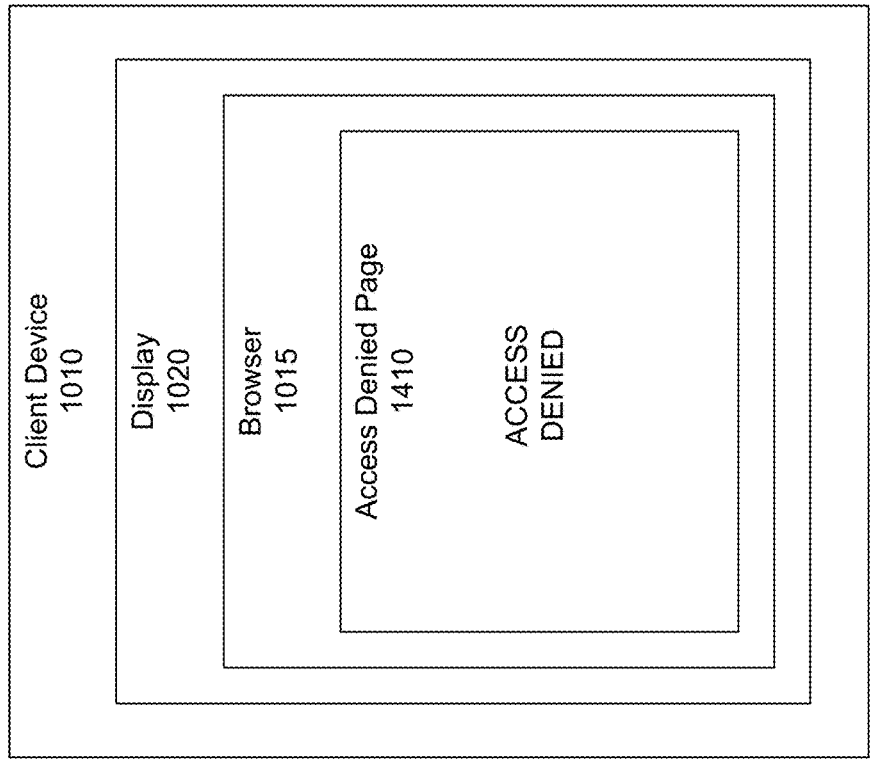
FIG. 14 shows an example of the client where the login has been denied.

If the passcodes do not match, in a step 950 (FIG. 9), the authorization provider denies user access to the protected server resources. FIG. 14 shows an example of a client where the authorization provider has indicated to the protected server that access is not authorized. In response, the protected server has delivered a page 1410 to the client to inform the user that access has been denied.

The unique identifiers, passcode generation algorithm, or both may be periodically changed or updated to help ensure the security of the system. Similarly, the unique identifiers may be stored in an encrypted format to help ensure security. If the user's mobile device is lost, stolen, or otherwise compromised, the system can alter the passcode generation algorithm of the server passcode generator such that it will be out-of-sync with the passcode generation algorithm of the mobile device passcode generator so that the compromised mobile device cannot be used to gain access to the protected resources.

As discussed above, in a specific embodiment the user does not manually enter a passcode when attempting to access the protected resources. For example, as shown in FIG. 10, no passcode input box is displayed on the login page to the protected resources. In another specific embodiment, the user may be required to manually input a passcode in order to access the protected resources. In this specific embodiment, the login page to the protected resources may include a passcode input box for the user to enter a static passcode (e.g., a passcode that the user remembers). In this specific embodiment, authentication of the user can involve both the static passcode and the unique time-based (or non-static) passcode.

For example, in this specific embodiment, the protected server may store a static passcode from the user. When the user wishes to access the protected resources, the user is required to manually input both a username registered with the protected server and a passcode registered with the protected server. If the username and passcode are valid, the protected server generates the machine-readable code identifying the protected server and the authentication process continues according to step 917 (FIG. 9) and subsequent steps. If the username and passcode are not valid, the protected server does not generate the machine-readable code and access to the protected resources can be immediately denied.

Requiring the user to input a static passcode as part of the authentication procedure can provide an additional layer of security. For example, even if a thief steals the user's mobile device (and the user is unable to notify the authentication provider of the theft so that the passcode algorithm can be changed), the thief will not be able to use the mobile device to access the protected resources because access will also require the static passcode. The option of whether authentication is based on the unique time-based passcode, or both the unique time-based passcode and static passcode can be configurable such as by the user or an administrator user.

Figure 15:
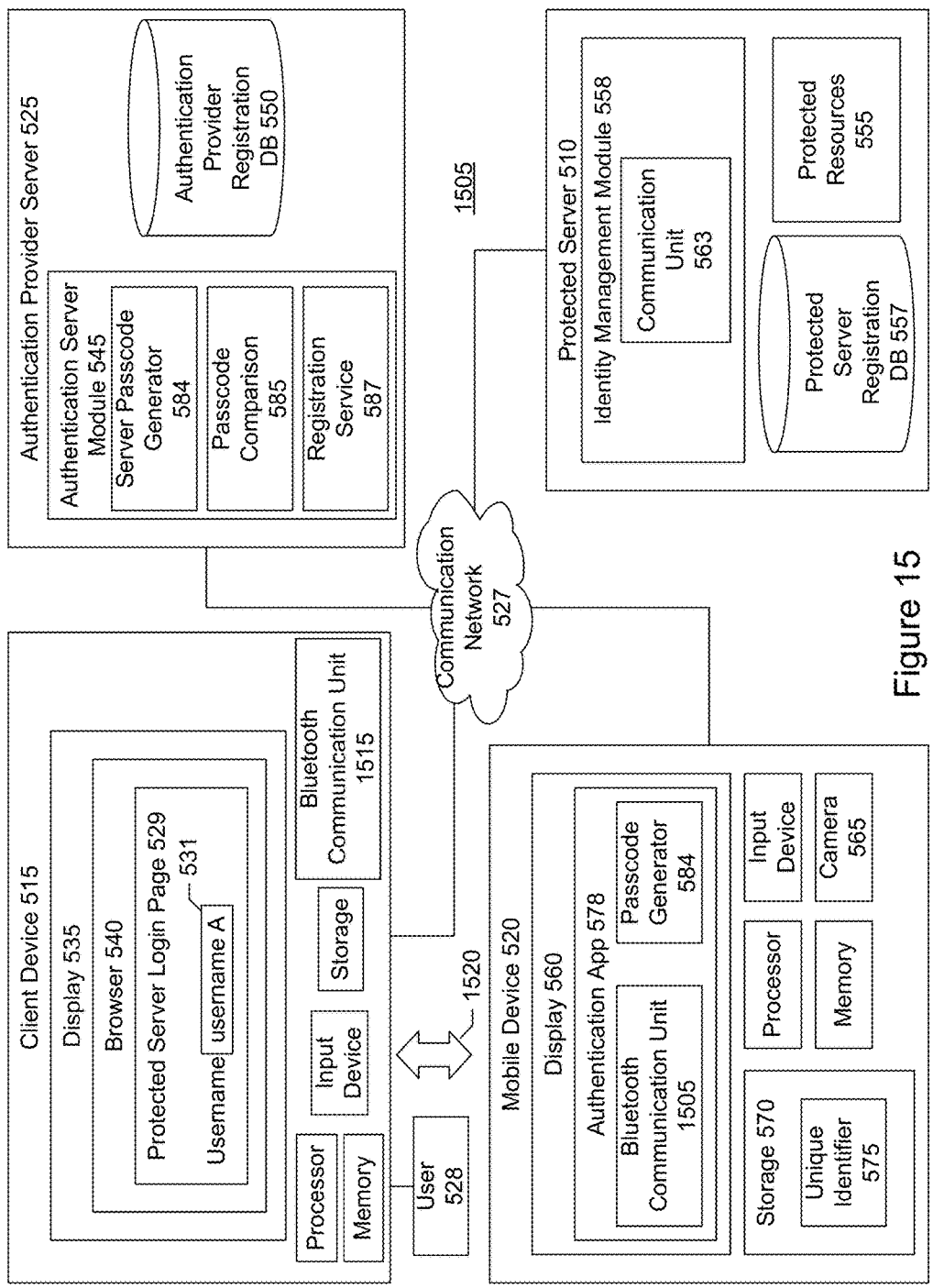
FIG. 15 shows a block diagram of a system using unique time-based passcodes for authorization according to another specific embodiment.

FIG. 15 shows another specific embodiment of a system 1505 for authentication using unique time-based passcodes or passwords. This system is similar to the system shown in FIG. 5. The system shown in FIG. 15, however, does not involve generating a machine-readable code. Rather, in this specific embodiment, the mobile device includes a Bluetooth communication unit 1505 and the client device includes a corresponding Bluetooth communication unit 1515 to establish a Bluetooth pairing or connection 1520 between the mobile device and the client device.

In this specific embodiment, the unique time-based passcode generated by the mobile device is transmitted over the Bluetooth connection to the client device which in turn forwards the unique time-based passcode (and other identification information) to the protected server which in turn forwards to the authentication provider.

For example, upon the user entering a valid username at the protected server login page, a request may be issued by the client device to the mobile device over the Bluetooth connection for the generation of the unique time-based passcode. In response to the request, the mobile device generates the unique time-based passcode and sends the unique time-based passcode (and other identification information, e.g., username registered at the authentication provider) over the Bluetooth connection to the client device which in turn forwards the unique time-based passcode and (and other identification information) to the authentication provider for authentication.

A benefit of the system shown in FIG. 15 is that it not necessary for the mobile device to have a connection to the protected server. For example, the user may be in an area where the mobile device is unable to receive cellular service such as in a basement.

It should be appreciated that Bluetooth is merely an example of a short-range wireless protocol that may be used to establish a short-distance wireless connection between the mobile device and the client device and that other wireless protocols may instead or additionally be used. Further, in other specific embodiments, there can be a wired connection established between the mobile device and the client device for the authentication process. Further, in another specific embodiment, the user may enter a static passcode at the protected server login page when an increased layer of security is desired. For example, in this specific embodiment, both the username and the static passcode is required to be validated before a request is issued over the Bluetooth connection for the unique time-based passcode.

In another specific embodiment, principles and aspects of the system are applied to authorizing credit card transactions. In this specific embodiment, a user registers their credit card account number (along with their mobile device) with the authorization provider. A unique identifier (e.g., key) associated with the credit card account is generated and stored at the mobile device and authorization provider.

When the user wishes to make a purchase, such as a purchase at an e-commerce website, the user provides their credit card account number. Upon inputting the credit card account number, a machine-readable code (e.g., QR code) is generated by the e-commerce website server and displayed at the client. The user uses their registered mobile device to scan the displayed machine-readable code. Upon scanning the machine-readable code, a first unique time-based passcode is generated using the stored identifier (e.g., key) and sent to the e-commerce website server which then forwards to the authentication provider.

The authentication provider calculates a second unique time-based passcode corresponding to the unique identifier stored at the authentication server and compares the two passcodes. If the passcodes match, the credit card transaction is authorized. If the passcodes do not match the credit card transaction is denied. This technique of authorizing credit card transactions is more secure than authorizing using the 3 or 4 digit security codes printed on the credit card because those security codes are static codes which can be easily compromised. In another specific embodiment, principles and aspects of the system are applied to authorizing credit card transactions at point-of-sale (POS) terminals such as may be found in a physical store (e.g., department store or restaurant).

In another specific embodiment, principles and aspects of the system are applied to authorizing automated teller machine (ATM) transactions. In this specific embodiment, the client includes an ATM machine. The user provides a debit card (or other user identifier) to the ATM. The ATM displays a machine-readable code. The user scans the machine-readable code using their registered mobile device. A first unique time-based passcode is generated on the mobile device using the stored identifier (e.g., key). The first unique time-based passcode (and other user information) is sent from the mobile device to the banking server to the authentication provider.

The authentication provider, using the received information, obtains the unique identifier (e.g., key) stored at the authentication provider and calculates a second unique time-based passcode. If the passcodes match, the authentication provider indicates that access to the ATM account is allowed. If the passcodes do not match, the authorization provider indicates that access to the ATM account is not allowed. Principles and aspects of the system may be applied to any situation where there is a need to verify identity. For example, the system may be used to verify the identity of an employee or contractor requesting access to a building.

In a specific embodiment, a method for authenticating a user at a client device to a website includes storing at a mobile device of the user a unique identifier and a first username associated with the unique identifier, the unique identifier and the first username having been stored during a registration of the user and mobile device at an authentication provider, capturing, at the mobile device, a machine-readable code displayed on the client device by the website, the machine-readable code identifying a server of the website and having been generated by the website in response to the user inputting to the website a second username that is registered at the website, upon the capturing, generating at the mobile device, a first unique time-based passcode based on the unique identifier stored at the mobile device, and transmitting the first unique time-based passcode and first username to the server identified by the machine-readable code for the server to forward the first unique time-based passcode and first username to the authentication provider, where the authentication provider uses the first username to retrieve a corresponding unique identifier stored at the authentication provider to calculate a second unique time-based passcode, where if the first and second unique time-based passcodes match, the authentication provider informs the server that access to the website should granted, and where if the first and second unique time-based passcodes do not match, the authentication provider informs the server that access to the website should be denied.

Figure 16:
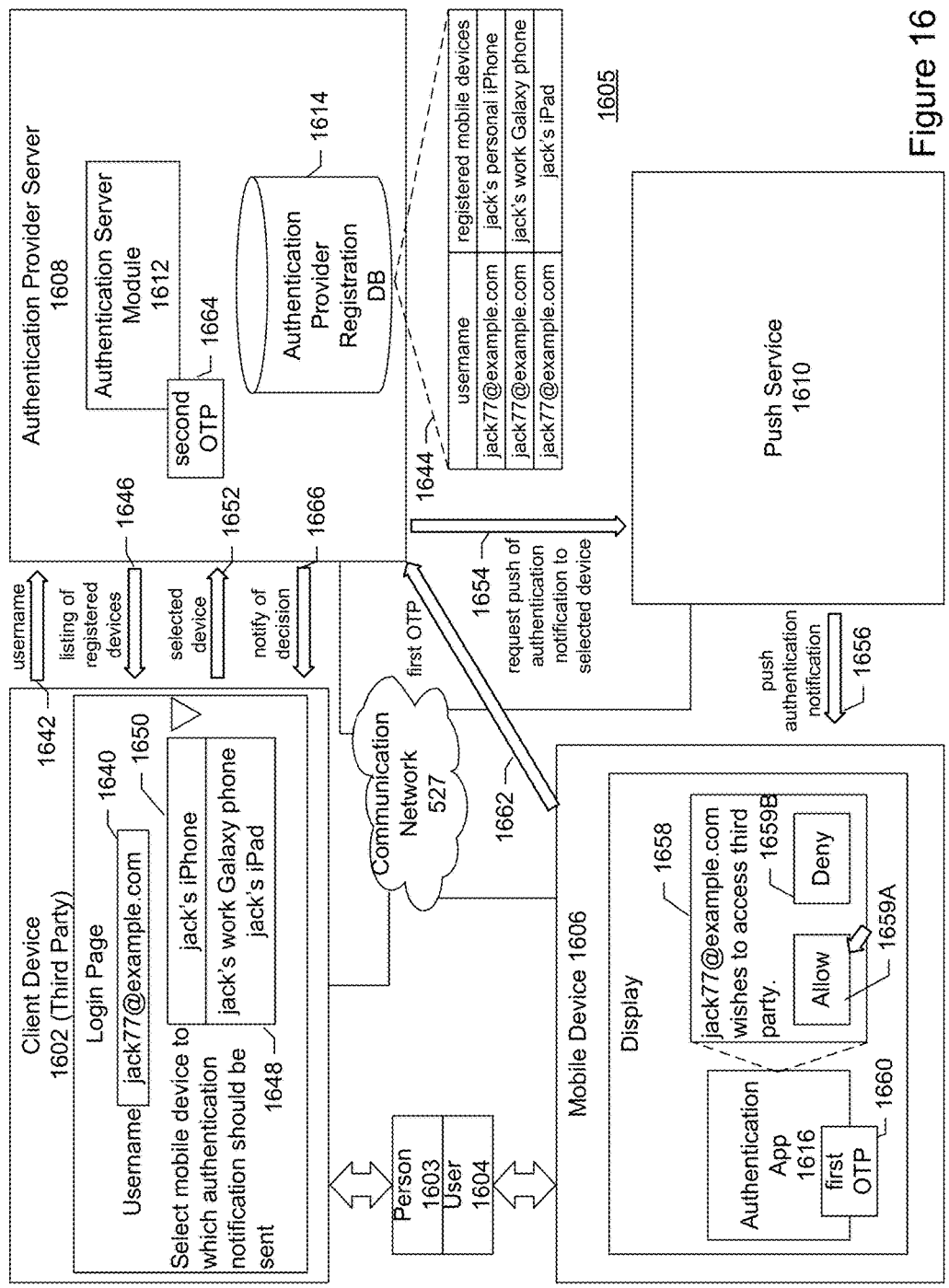
FIG. 16 shows a block diagram of a system for authenticating users according to another specific embodiment.

FIG. 16 shows a block diagram of another specific embodiment of a system 1605 for authenticating users. In this specific embodiment, the machine-readable code is omitted. This system includes a client device 1602 through which a person 1603 is using to attempt to access a third party (or protected system, website, server, or machine), a mobile device 1606 belonging to a user 1604, an authentication server 1608, and a push service 1610. The push service, third party (client device), mobile device, and authentication server are connected by a communication network.

The authentication server includes an authentication server module 1612 and a registration database 1614. The authentication server module provides authentication services for the third party. For example, the third party can use the authentication services to authenticate a user that may have an account with the third party. The authentication services can be used to prove or show that a person attempting to access the third party is true or genuine (e.g., that person 1603 is in fact user 1604, or that person 1603 and user 1604 are the same entities).

The registration database stores information that may include, for example, user information for users registered with the authentication provider, user information for users registered with the third party, user account information, information identifying mobile devices that the users have registered, mobile device names, user email addresses, user names, phone numbers, or combinations of these.

The mobile device belonging to the user includes an authentication application or "app" 1616. The authentication app communicates with the authentication server to help authenticate person 1603 who is attempting or trying to access the third party. When there is an attempt to access the third party, the authentication server communicates with the authentication app on a user's mobile device to alert the user that someone is trying to access their account with the third party. The user uses the authentication app on their mobile device to confirm that they are in fact the "someone" or "person" who is currently trying to access the third party; or confirm that they are not in fact the "someone" or "person" currently trying to access the third party. The authentication app can run on the mobile device as a background process or state.

The push service provides services that the authentication provider can use to send information from the authentication server to the users or, more particularly, the authentication application programs or "apps" on the mobile devices. Examples of push services include Apple Push Notification (APN), Google Cloud Messaging (GCM), and others. The authentication server module can interface with any number of different push service providers through various application programming interfaces (APIs) in order to deliver notifications, messages, communications, commands, instructions, or other information to the various mobile devices. For example, the GCM service can be used to push messages to mobile devices running the Android operating system (e.g., Samsung Galaxy S7 or Samsung Galaxy Note). The APN service can be used to push messages to mobile devices running the Apple iOS operating system (e.g., Apple iPhone, Apple iPad).

With the system shown in FIG. 16, a person can be authenticated to access the third party (or website of the third party) as long as the person has their mobile device with them (e.g., on their person, in their pocket, or in a location readily accessible). The third party can be, for example, a financial services website (e.g., Wells Fargo), e-commerce website (e.g., Amazon or eBay), or streaming media service (e.g., Netflix) at which the user has an account. In this specific embodiment, the person merely needs to provide the third party with their registered user identifier (e.g., username or user email address) and identify the mobile device to which an authentication notification should be sent.

For example, a user may own multiple mobile devices such as smartphone or tablet computer. As another example, the user may have a joint account with the third party in which there could be the user's spouse, partner, or other person also authorized to access the account. If, for example, the user is attempting to access their online bank account and currently has with them their smartphone, but not their tablet, the user can identify their smartphone as the mobile device to which the authentication notification should be sent. In other words, the user may currently be away from their home or office but may have on their possession their smartphone in their pocket or purse while their tablet is not within their possession.

The user does not have to input a password to the third party or scan a QR code. Being able to be authenticated without having to input a password or scan a QR code greatly improves the user experience. For example, the user does not have to remember a password. The user does not have to try and align their mobile device's camera to scan a displayed QR code.

Figure 17:
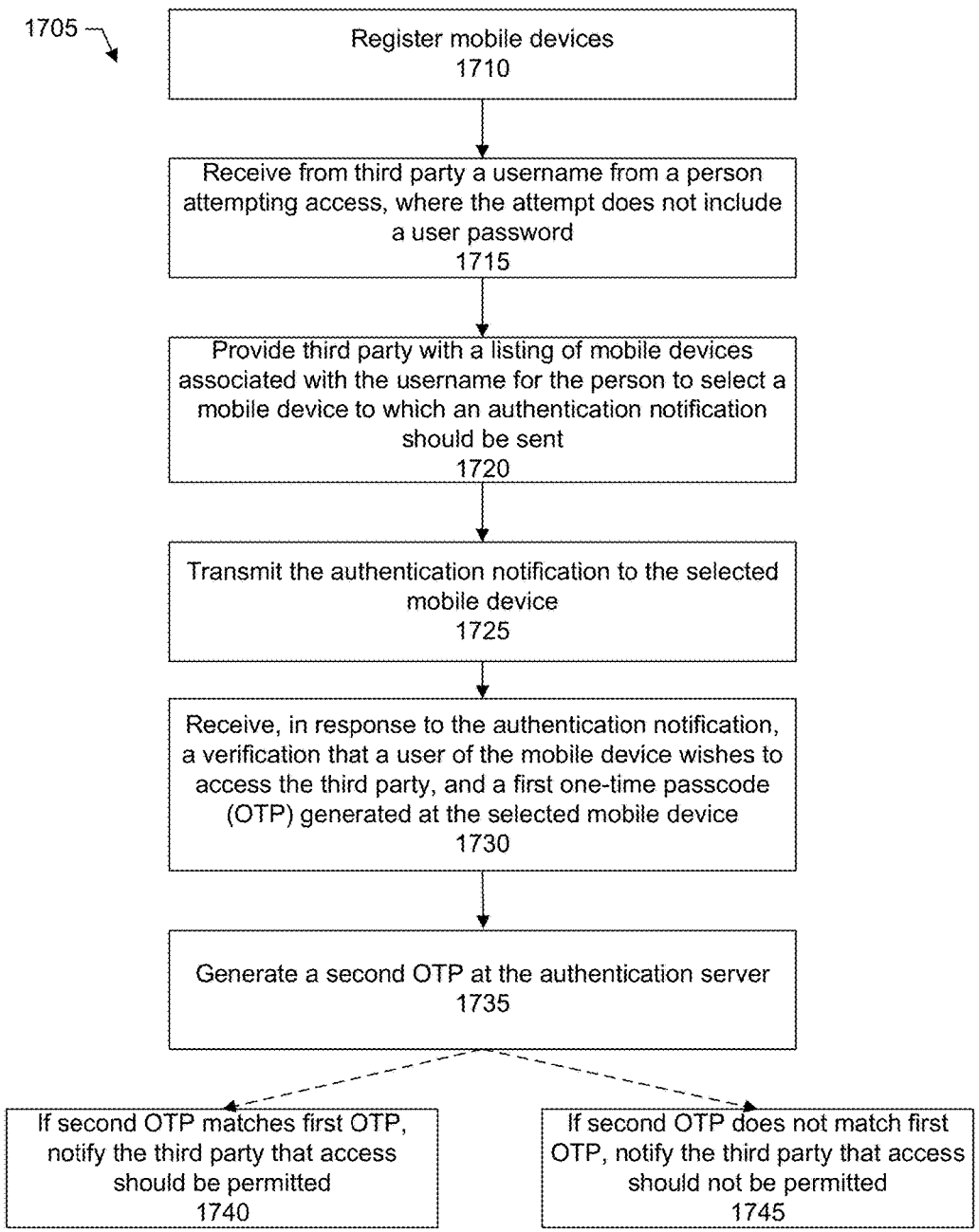
FIG. 17 shows an overall flow diagram of the system shown in FIG. 16.

FIG. 17 shows an overall flow 1705 of the system shown in FIG. 16. In a step 1710, there is a registration process. The registration process may be similar to the registration discussed above. The registration includes the user downloading and installing the authentication app onto their mobile devices and registering their user identifier and mobile devices with the authentication provider server.

As discussed above, the authentication server (1608, FIG. 16) includes registration database 1614. The registration database stores a listing of registered users and identifications of the mobile devices that are associated with the user. A user can register any number of mobile devices. For example, a user may have a personal smartphone, work smartphone, tablet computer, and so forth. In an embodiment, the registration process further includes registering the mobile devices with the push services (e.g., GCM or APN). Registering the mobile devices with the push services allows the authentication provider to transmit notifications to the mobile devices. The ability to register multiple devices also allows or facilitates authentication of users having a joint account with the third party, having multiple mobile devices, or both.

In a step 1715, the authentication server receives from a third party a username or other user identifier (e.g., email address) from a person attempting access, where the attempt does not include user inputting of a user password. In other words, the third party does not receive a user password. The person does not input (e.g., type or enter) a password.

In a step 1720, the authentication server consults the registration database with the received username to identify a listing of mobile devices associated with the username. The authentication server provides the third party with the listing of mobile devices for display to the person. This allows the person to select a mobile device to which an authentication message should be sent.

In a step 1725, upon the person selecting a mobile device, the authentication server transmits via the push service an authentication notification to the selected mobile device. The authentication notification includes a message informing a user of the mobile device that a person has requested access or login to the third party. The notification prompts the user of the mobile device to verify whether or not they are in fact the person attempting the access. If the user indicates access should be permitted (e.g., the person attempting access is in fact the user), the authentication app generates a first OTP. The first OTP is automatically transmitted by the authentication app from the selected mobile device to the authentication server. In an embodiment, the first OTP is not displayed to the user of the mobile device as there is no need for the user to manually input the first OTP.

Alternatively, if the user indicates that access should not be permitted (e.g., the person attempting access is not in fact the user), the authentication app does not generate the first OTP or generates an invalid first OTP to indicate to the authentication server that the person attempting access is not in fact the user. The authentication server, upon receiving the indication from the mobile device, can then notify the third party that the person should be denied access.

In the example shown in FIG. 17, in a step 1730, the authentication server receives in response to the authentication notification, a verification that the user indeed currently wishes to access the third party, and the first OTP. In a step 1735, a second OTP is generated at the authentication server. The authentication server can compare the second and first OTPs to determine whether they match. If the second OTP matches the received first OTP, the authentication server notifies the third party that access should be permitted (step 1740). If the second OTP does not match the received first OTP, the authentication server notifies the third party that access should not be permitted, e.g., access should be blocked (step 1745).

The user's mobile device can function as a key through which the user can gain access to the third party (or their account managed by the third party). For example, a thief who happens to know the user's username will not be able to access the account at the third party because the user, upon seeing the authentication notification at their mobile device (step 1725), can simply indicate that they are not in fact currently trying to access their account and deny the verification request. In this case, the authentication app will inform the authentication server that the user currently does not wish to access the third party. The authentication server, in turn, informs the third party to deny the access.

Referring back now to FIG. 16, table A below provides detail for a specific flow shown in the example of FIG. 16.

TABLE A

| Step | Description |
|---|---|
| 1640 | Person inputs (e.g., enters or types) a username at a website of the third party. |
| 1642 | The third party transmits the username to the authentication server. |
| 1644 | The authentication server receives the username from the third party and scans the registration database with the username to identify a listing of registered mobile devices associated with the username. |
| 1646 | The authentication server transmits the listing of registered mobile devices to the third party for display to the person. |
| 1648 | The third party displays on an electronic screen of the client machine the listing of registered mobile devices for the person to select (e.g., display in a drop down menu box). |
| 1650 | The person selects a mobile device to which the authentication notification is to be sent. |
| 1652 | The third party transmits an identification of the selected mobile device to the authentication server. |
| 1654 | The authentication server generates a request to the appropriate push service to push the authentication notification to the selected mobile device. |
| 1656 | The push service pushes the authentication notification to the selected mobile device. |

TABLE A-continued

| Step | Description |
|---|---|
| 1658 | The authentication notification is received by the authentication app at the selected mobile device. The authentication notification is displayed on an electronic screen or display of the selected mobile device. The authentication notification includes a message indicating that an attempt has been made to access the third party and prompting a user of the mobile device to verify whether they are in fact the person trying to access the third party. For example, the user can select "Allow" 1659A to indicate that they are in fact currently trying to access their account at the third party (e.g., Wells Fargo) or select "Deny" 1659B to indicate that they are not currently trying to access the account. |
| 1660 | Upon the user indicating that they are in fact currently trying to access their account at the third party, the authentication app generates a first OTP. |
| 1662 | The first OTP is transmitted from the mobile device to the authentication server. |
| 1664 | The authentication server generates a second OTP and determines whether the second OTP matches the first OTP. If the second OTP matches the first OTP, the authentication server determines that the person should be allowed to access the account at the third party. If the second OTP does not match the first OTP, the authentication server determines that the person should not be allowed the access. |
| 1666 | The authentication server notifies the third party of the decision to grant or deny access. |

Figure 18:
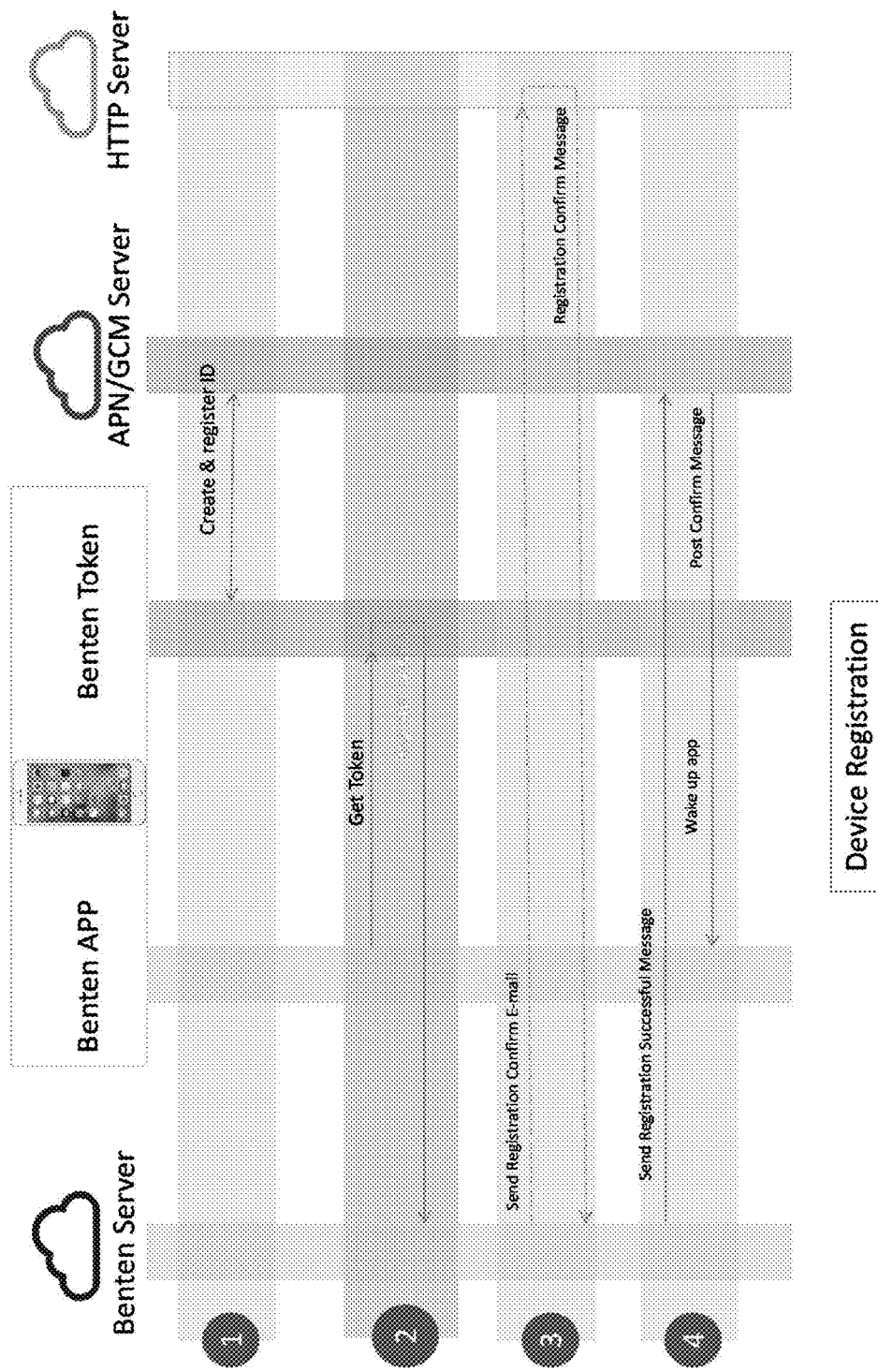
FIG. 18 shows an example of a sequence diagram for registering mobile devices according to a specific embodiment.
Figure 19:
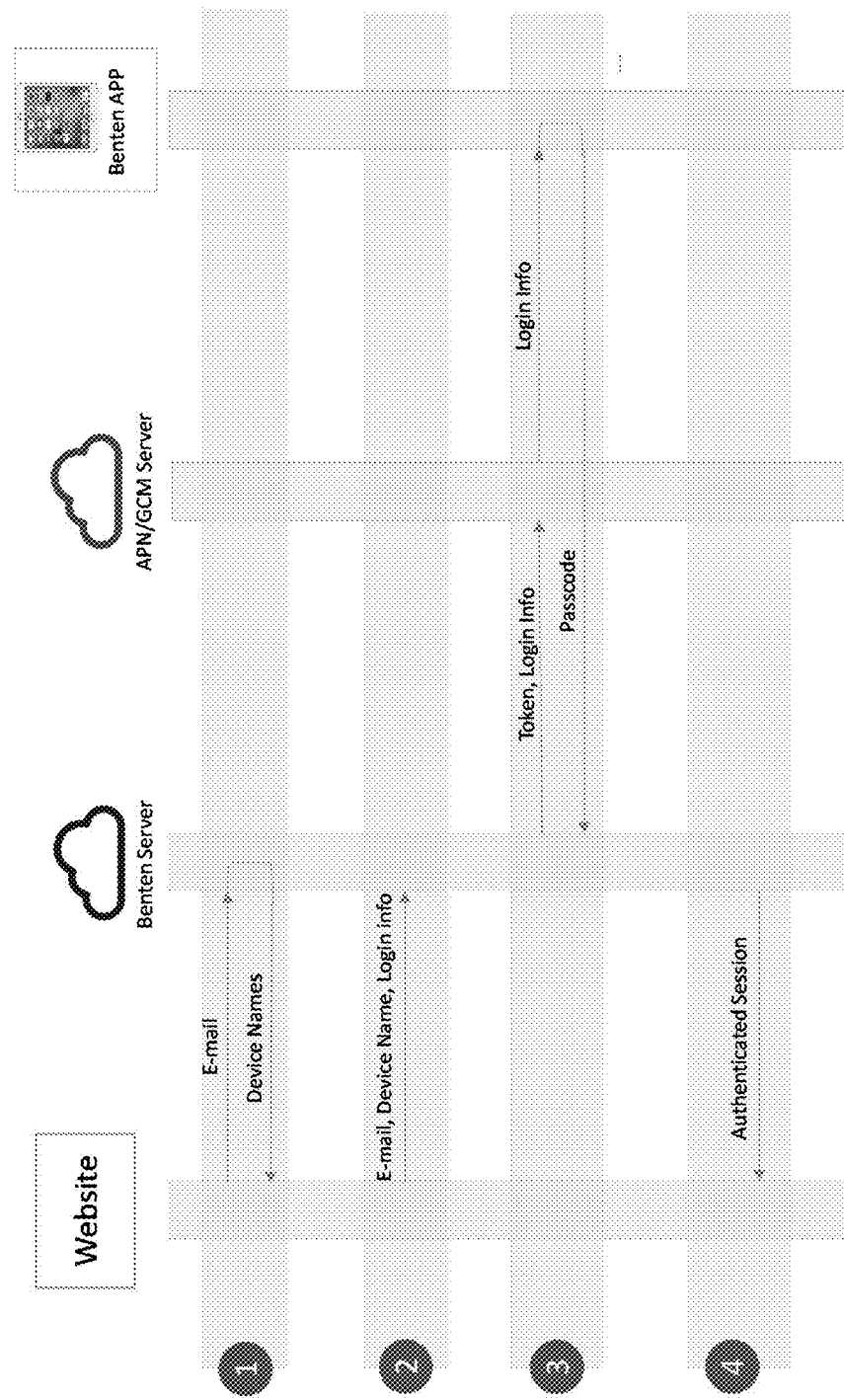
FIG. 19 shows an example of a sequence diagram for authenticating a person.

FIGS. 18-19 show sequence diagrams for a specific embodiment of the system shown in FIG. 16. FIG. 18 shows a sequence diagram for mobile device registration. FIG. 19 shows a sequence diagram for authentication or login to a website of a third party. To prove operability, a prototype of the authentication system was built, tested, and verified to operate as intended. In this specific embodiment, the system is referred to as Benten. Specifically, there is a Benten server or authentication server and a Benten authentication mobile application program or "app." The push services include Apple Push Notification (APN) and Google Cloud Messaging (GCM). It should be appreciated, however, that the system may be referred to using any name or other identifier and that other push services may instead or additionally be used.

Table B below provides detail for specific flow for device registration shown in the example of FIG. 18.

TABLE B

| Step | Description |
|---|---|
| 1 | Register a device with the GCM or APN. Benten App will be assigned a unique token by the GCM/APN which will be used to forward notification to the device. |
| 2 | Send registration packet to the Benten Server. Benten App prompts user for additional data like first and last name, email and device name. |
| 3 | Benten server will send a registration confirmation e-mail to the registered e-mail address. Device will be marked as unconfirmed till the user clicks on the confirmation e-mail, which will trigger a message back to the Benten Server. |
| 4 | Benten server will send a APN/GCM request to the APN/GCM server on receiving a registration confirmation message. Benten App will be woken up and a message will be displayed indicating to the user that the device registration is complete. |

Table C below provides detail for a specific flow for login to a website of a third party shown in the example of FIG. 19.

TABLE C

| Step | Description |
|---|---|
| 1 | User inputs E-mail on the login page. Website communicates with Benten Server and gets a list of all registered devices for the E-mail. |
| 2 | User selects the device where authentication notification should be sent. Website will forward login information to Benten Server. |
| 3 | Benten Server will lookup the GCM/APN token for the device selected and pass the login information to the Benten App via the GCM/APN server. Benten App will generate a passcode for the login request and send it to Benten Server. |
| 4 | Benten Server will generate passcode at the server and verify that the passcode matches. If it does, it will send an authenticated session id back to the Website allowing user access to the site. |

A specific implementation of the system is for authenticating users to websites. The principles of the system apply to authentication to other things (not just websites) including physical objects that may be embedded with electronics, software, sensors, and network connectivity that enables these objects to collect and exchange data. These physical objects may be referred to as the Internet of Things (IoT). For example, principles of the system apply to authentication of a person to enter a building, operate a vehicle (e.g., car, truck, bus, boat, plane, or drone), operate an appliance (e.g., television set, refrigerator, or washing machine), and so forth.

In a specific embodiment, there is a system to authenticate a person for a third party, comprising: a storage device; and a processor configured to: receive, at an authentication server, a request from the third party to authenticate an attempt by the person to access the third party, the request comprising a user identifier input by the person during the attempt, wherein the input of the user identifier by the person during the attempt is not accompanied by a password; retrieve, from a registration database at the authentication server, a list of one or more mobile devices registered at the authentication server and associated with the user identifier; transmit, from the authentication server, the list to the third party for the third party to display to and receive from the person a selection of a mobile device from the list to which an authentication notification should be sent; receive, from the third party, the selection of the mobile device by the person; transmit, from the authentication server, the authentication notification to a push service for the push service to push the authentication notification to the selected mobile device, wherein the authentication notification is received by an authentication application ("app") executing on the selected mobile device, wherein upon receipt of the authentication notification the authentication app displays on an electronic screen of the selected mobile device a prompt for a user of the selected mobile device to verify whether the access to the third party should be allowed or denied, and wherein if a verification from the user is received indicating that the access should be allowed, the authentication app on the selected mobile device generates a first one-time passcode (OTP) and transmits the first OTP to the authentication server; receive, at the authentication server from the selected mobile device, the first OTP; generate, at the authentication server, a second OTP; determine if the second OTP matches the first OTP; if the second OTP matches the first OTP, notify the third party that the attempt to access should be permitted; and if the second OTP does not match the first OTP, notify the third party that the attempt to access should be blocked.

The push service may include Apple Push Notification (APN) service or Google Cloud Messaging (GCM) service.

In another specific embodiment, there is a computer program product for authenticating a person to a third party, comprising a non-transitory computer readable medium having program instructions embodied therein for: receiving, at an authentication server, a request from the third party to authenticate an attempt by the person to access the third party, the request comprising a user identifier input by the person during the attempt, wherein the input of the user identifier by the person during the attempt is not accompanied by a password; retrieving, from a registration database at the authentication server, a list of one or more mobile devices registered at the authentication server and associated with the user identifier; transmitting, from the authentication server, the list to the third party for the third party to display to and receive from the person a selection of a mobile device from the list to which an authentication notification should be sent; receiving, from the third party, the selection of the mobile device by the person; transmitting, from the authentication server, the authentication notification to a push service for the push service to push the authentication notification to the selected mobile device, wherein the authentication notification is received by an authentication application ("app") executing on the selected mobile device, wherein upon receipt of the authentication notification the authentication app displays on an electronic screen of the selected mobile device a prompt for a user of the selected mobile device to verify whether the access to the third party should be allowed or denied, and wherein if a verification from the user is received indicating that the access should be allowed, the authentication app on the selected mobile device generates a first one-time passcode (OTP) and transmits the first OTP to the authentication server; receiving, at the authentication server from the selected mobile device, the first OTP; generating, at the authentication server, a second OTP; determining if the second OTP matches the first OTP; if the second OTP matches the first OTP, notifying the third party that the attempt to access should be permitted; and if the second OTP does not match the first OTP, notifying the third party that the attempt to access should be blocked.

In a specific embodiment, a user registers a mobile device with an authentication provider and a unique identifier is stored at the mobile device and authentication provider. The user registers at a protected server. When the user is at a client and wishes to access the protected server, the user inputs their username. A machine-readable code identifying the protected server is generated based on the username and displayed at the client. The user uses the mobile device to scan the machine-readable code. A first unique time-based passcode is generated using the unique identifier stored at the mobile device. The first unique time-based passcode is sent to the protected server identified by the machine-readable code and forwarded to the authentication provider. The authentication provider generates a second unique time-based passcode using the unique identifier stored at the authentication server. If the passcodes match, access is authorized. If the passcodes do not match, access is denied.

In a specific embodiment, the first unique time-based passcode is a unique time-based passcode that is generated seeded by the unique identifier registered for that mobile device for a time period. The protected server when it receives the mobile's unique time-based passcode will perform the same generation of a time-based passcode on the server. If the passcodes match, access is authorized.

In a specific embodiment, the machine-readable code includes a quick response (QR) code. The machine-readable code or QR code is one implementation of providing the passcode to the protected application/server; Bluetooth keyboard is another. QR code may be the more secure version as the data is never entered onto the client machine so keyloggers cannot be used to sniff the time based passcode. In a specific embodiment, a Bluetooth keyboard implementation includes a Bluetooth HID (Human Interface Device) Profile which can be paired with a PC (personal computer) that has Bluetooth capabilities to allow the PC to receive the passcode from the secure device as if passcode was typed on a keyboard.

In a specific embodiment, a feature of the system allows authentication between two end points on the web using algorithmic passcodes which are non-persistent. Authentication of a user logging into his or her online account or authentication of a credit card transaction being two such examples. The passcode is specific to a given user and the website or in case of a credit card transaction, is specific to the user to whom the card belongs and the credit card. A time-bound passcode is generated at the client end which then is transmitted to the server where a passcode is generated for the given user. If the two passcodes match then the transaction is authorized else the transaction is denied.

A feature of the system eliminates the need for users to come up with a complicated passcode or password that he or she needs to remember. Websites (e.g., e-commerce websites) benefit by not having to save these passcodes and have these stolen by hackers. Since the passcodes are generated based on an algorithm that rotates on a given time threshold (where the default algorithm can also be changed or rotated based on time to change the passcodes that are generated) and are not persistent, phishing becomes redundant.

For credit card companies, having an algorithmic passcode in addition to the credit card number makes the transaction more secure. Adoption of this technology will help to ensure that the credit card numbers themselves will become completely harmless. Even if hackers gain access to these numbers, they would not be able to use them for a transaction as no transaction would be complete without the algorithmic passcode.

In a specific embodiment, a user wishing to access a protected resource will specify, at a login page, the username first and then when they tab out of the username field to the passcode field (or any other field on the page), a machine-readable code will be displayed. In some embodiments, no passcode field is displayed at the login page.

In this specific embodiment, the machine-readable code includes:
1. Session id for the username entered
2. URL (end-point) where the message needs to be routed by the app with the passcode The user's authentication app will read the above machine-readable code and route the current passcode for the user to the end-point specified in the machine-readable code along with the session id. The end-point will be the site where the authentication is being initiated. The site will then forward the passcode and other relevant user information such as the username to an authentication service provider. In a specific embodiment, the authentication service is referred to as the Benten Web Service and the authentication app is referred to as the Benten App. The authentication service provider will then generate a passcode for the user. If the passcode matches to the passcode passed in the request, then the response from authentication service back to the client site will be success, else it will be a failure.

This same mechanism may be applied to credit card authorizations. The site where the client is about to make a purchase will have a machine-readable code displayed next to the credit card number field. The machine-readable code will contain the same session id and the end-point. The user's authentication app will read the machine-readable code and route the current passcode for the given credit card to the end-point specified in the machine-readable code. The site will then forward the passcode with other relevant credit card information to the credit card authorization web service (e.g., Benten web service hosted by the credit card company) where the passcode will be generated for the given credit card. If the passcode matches the passcode passed in the request, then the response from Web service back to the client site will be success, else the authorization will be declined.

In a specific embodiment, a non-persistent passcode is valid only for a short duration of, for example, 15 seconds. The passcode is generated using a unique set of identifiers for a given user using a proprietary algorithm. The client authentication application has access to such an algorithm and the server of the site wanting to authenticate the user uses the same algorithm to generate the passcode for authentication purposes.

Users can authenticate their identities while logging into their account over the Internet with a non-persistent passcode which is generated using a proprietary algorithm. The passcode is specific for a given user and lives only for a given amount of time. The user generates the passcode on her device (e.g., smartphone, tablet, laptop, or desktop) using this proprietary algorithm. The website (e.g., website providing authentication services) also uses the same proprietary algorithm to generate this user specific passcode. If the passcode provided is identical, then the user gains access. Else the user is denied access.

In a specific embodiment, a unique identifier for a user is stored at a client device (e.g., a mobile communications device) and a server. When the user wishes to access a website, a passcode generator program on the client device uses the identifier stored at the client device to generate a first passcode. The first passcode can be provided to the website. A passcode generator program on the server uses the identifier stored at the server to generate a second passcode. The client and server passcode generators use identical algorithms to generate the passcodes. If the passcodes match, the user is allowed to access the website. If the passcodes do not match, the user is not allowed to access the website. After a threshold duration has elapsed, the passcodes are expired.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A computer-implemented method comprising:
receiving, at an authentication server, a request from a third party server to authenticate an attempt to access a user account stored by the third party server, the request comprising a user identifier input during the attempt, each of the authentication and third party servers being computing devices,
wherein the input of the user identifier during the attempt is not accompanied by a password;
retrieving, from a registration database at the authentication server, a list of one or more mobile devices registered at the authentication server by a user and associated with the user identifier, the one or more mobile devices, and the user account belonging to the user;
transmitting an authentication notification from the authentication server to a push service for the push service to push the authentication notification to at least one mobile device from the list of one or more mobile devices belonging to the user, the authentication notification comprising a prompt to be displayed at the at least one mobile device for the user to verify that they are in fact currently attempting to access their user account or verify that they are not in fact currently attempting to access their user account;

receiving, at the at least one mobile device, the authentication notification from the push service;

in response to receiving the authentication notification at the at least one mobile device, displaying, on an electronic screen of the at least one mobile device, the prompt in the authentication notification for the user to verify that they are in fact currently attempting to access their user account or verify that they are not in fact currently attempting to access their user account;

receiving, at the at least one mobile device in response to the prompt, one of first or second indications from the user, the first indication being a verification from the user that they are in fact currently attempting to access their user account, and the second indication being a verification from the user that they are not in fact currently attempting to access their user account;

when the first indication is received,
generating, at the at least one mobile device, a first one-time passcode (OTP);
transmitting the first OTP from the at least one mobile device to the authentication server;
receiving, at the authentication server from the at least one mobile device, the first OTP;
generating, at the authentication server, a second OTP;
determining if the second OTP matches the first OTP;
if the second OTP matches the first OTP, notifying the third party server of the verification from the user that they are in fact currently attempting to access their user account; and
if the second OTP does not match the first OTP, notifying the third party server that the attempt to access the user account should be blocked; and when the second indication is received,
generating, at the at least one mobile device, an invalid OTP;
transmitting the invalid OTP from the at least one mobile device to the authentication server;
receiving, at the authentication server from the at least one mobile device, the invalid OTP;
based on the invalid OTP, determining that the user is not in fact currently attempting to access their user account; and
notifying the third party server that the attempt to access the user account should be blocked.

2. The method of claim 1 wherein the user identifier comprises an email address or a username.

3. The method of claim 1 comprising:
transmitting, from the authentication server to the third party server, the list of one or more mobile devices registered at the authentication server and associated with the user identifier; and
receiving, at the authentication server from the third party server, a selection of a mobile device from the list, the selected mobile device being the at least one mobile device to which the authentication notification is to be transmitted.

4. The method of claim 1 wherein access to the user account stored by the third party server is authenticated without the third party server having to receive a one-time password.

5. The method of claim 1 wherein the third party server is different from the authentication server.

6. The method of claim 1 wherein the third party server comprises a website.

7. The method of claim 1 wherein the third party server comprises at least one of a financial services website, e-commerce website, or streaming media website.

8. The method of claim 1 wherein the mobile device comprises a smartphone or a tablet computer.

9. The method of claim 1 wherein an authentication app on the at least one mobile device does not display the first one-time passcode to the user.

10. The method of claim 1 wherein the third party server does not receive the first one-time passcode.

11. The method of claim 1 wherein access to the user account stored by the third party server is permitted without entering any of the password, the first OTP, or the second OTP.

12. A system comprising:
a storage device; and
a processor configured to:
receive, at an authentication server, a request from a third party server to authenticate an attempt to access a user account stored by the third party server, the request comprising a user identifier input during the attempt, each of the authentication and third party servers being computing devices,
wherein the input of the user identifier during the attempt is not accompanied by a password;
retrieve, from a registration database at the authentication server, a list of one or more mobile devices registered at the authentication server by a user and associated with the user identifier, the one or more mobile devices, and the user account belonging to the user;
transmit an authentication notification from the authentication server to a push service for the push service to push the authentication notification to at least one mobile device of the one or more mobile devices belonging to the user, wherein the authentication notification comprises a prompt to be displayed at the at least one mobile device belonging to the user for the user to verify that they currently wish to access the user account or verify that they currently do not wish to access the user account;
receive, at the at least one mobile device by an authentication application ("app") executing on the at least one mobile device, the authentication notification from the push service;
display, on an electronic screen of the at least one mobile device, the prompt in the authentication notification for the user to verify that they currently wish to access the user account or verify that they currently do not wish to access the user account;
receive, at the at least one mobile device, one of first or second responses from the user, the first response being a verification from the user that they currently wish to access the user account, and the second response being a verification from the user that they currently do not wish to access the user account;
if the first response is received,
generate, at the at least one mobile device, a first one-time passcode (OTP);
transmit the first OTP from the at least one mobile device to the authentication server;
receive, at the authentication server from the at least one mobile device, the first OTP;

generate, at the authentication server, a second OTP;
determine if the second OTP matches the first OTP;
if the second OTP matches the first OTP, notify the third party server that the attempt to access the user account should be permitted; and
if the second OTP does not match the first OTP, notify the third party server that the attempt to access the user account should be blocked; and
if the second response is received,
generate, at the at least one mobile device, an invalid OTP indicating that the user currently does not wish to access the user account;
transmit the invalid OTP from the at least one mobile device to the authentication server;
receive, at the authentication server from the at least one mobile device, the invalid OTP;
based on the invalid OTP, determine that the user currently does not wish to access the user account; and
notify the third party server that the attempt to access the user account should be blocked.

13. The system of claim 12 wherein the push service comprises Apple Push Notification (APN) service.

14. The system of claim 12 wherein the push service comprises Firebase Cloud Messaging (FCM) (formerly referred to as Google Cloud Messaging (GCM) service).

15. A computer program product comprising a non-transitory computer readable medium having program instructions embodied therein for:
receiving, at an authentication server, a request from a third party server to authenticate an attempt to perform an online transaction associated with a user account stored by the third party server, the request comprising a user identifier input during the attempt, each of the authentication and third party servers being computing devices,
wherein the input of the user identifier during the attempt is not accompanied by a password;
retrieving, from a registration database at the authentication server, a list of one or more mobile devices registered at the authentication server by a user and associated with the user identifier, the one or more mobile devices, and the user account belonging to the user;
transmitting an authentication notification from the authentication server to a push service for the push service to push the authentication notification to at least one mobile device of the one or more mobile devices belonging to the user, wherein the authentication notification comprises a prompt to be displayed at the at least one mobile device belonging to the user for the user to confirm that they are in fact attempting to perform the online transaction or confirm that they are not in fact attempting to perform the online transaction;
receiving, at the at least one mobile device, the authentication notification from the push service;
displaying, on an electronic screen of the at least one mobile device belonging to the user, the prompt in the authentication notification for the user to confirm that they are in fact attempting to perform the online transaction or confirm that they are not in fact attempting to perform the online transaction, wherein displaying the prompt is before generation of a one-time passcode (OTP);
receiving, at the at least one mobile device, one of first or second indications from the user, the first indication being a confirmation from the user that they are in fact attempting to perform the online transaction, and the second indication being a confirmation from the user that they are not in fact attempting to perform the online transaction;
if the first indication is received,
generating, at the at least one mobile device, a first OTP in response to the user confirming that they are in fact attempting to perform the online transaction;
transmitting the first OTP from the at least one mobile device to the authentication server;
receiving, at the authentication server from the at least one mobile device, the first OTP;
generating, at the authentication server, a second OTP;
determining if the second OTP matches the first OTP;
if the second OTP matches the first OTP, notifying the third party server that the attempt to perform the online transaction should be permitted; and
if the second OTP does not match the first OTP, notifying the third party server that the attempt to perform the online transaction should be blocked; and
if the second indication is received,
not generating the first OTP in response to the user confirming that they are not in fact attempting to perform the online transaction;
generating, at the at least one mobile device, an invalid OTP;
transmitting the invalid OTP from the at least one mobile device to the authentication server;
receiving, at the authentication server from the at least one mobile device, the invalid OTP;
based on the invalid OTP, determining that the user is not in fact attempting to perform the online transaction; and
notifying the third party server, by the authentication server, that the attempt to perform the online transaction should be blocked.

16. The method of claim 1 wherein the displaying the prompt in the authentication notification is before generation of an OTP.

17. The method of claim 1 wherein the when the second indication is received comprises:
not generating the first OTP; and
generating an indication that the user is not in fact currently attempting to access their user account.

18. The method of claim 1 wherein the invalid OTP is an indication that the user is not in fact currently attempting to access their user account.

19. The computer program product of claim 15 wherein the online transaction comprises a user account access authorization or a credit card transaction.

\* \* \* \* \*